(12) United States Patent
Saitoh et al.

(10) Patent No.: US 9,330,705 B2
(45) Date of Patent: May 3, 2016

(54) OPTICAL RECORDING AND PLAYBACK APPARATUS

(71) Applicant: Panasonic Intellectual Property Management Co., Ltd., Osaka (JP)

(72) Inventors: Yohichi Saitoh, Kyoto (JP); Hideki Hayashi, Nara (JP); Jun-ichi Asada, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/627,353

(22) Filed: Feb. 20, 2015

(65) Prior Publication Data
US 2015/0279410 A1 Oct. 1, 2015

Related U.S. Application Data

(63) Continuation of application No. PCT/JP2014/005552, filed on Nov. 5, 2014.

(30) Foreign Application Priority Data

Mar. 26, 2014 (JP) .................. 2014-063509

(51) Int. Cl.
*G11B 7/09* (2006.01)
*G11B 7/1392* (2012.01)
(Continued)

(52) U.S. Cl.
CPC ............ *G11B 7/13927* (2013.01); *G11B 7/003* (2013.01); *G11B 7/0901* (2013.01); *G11B 7/0903* (2013.01); *G11B 7/094* (2013.01); *G11B 7/24009* (2013.01); *G11B 7/13* (2013.01);
(Continued)

(58) Field of Classification Search
None
See application file for complete search history.

(56) References Cited

U.S. PATENT DOCUMENTS 6,567,353 B1 5/2003 Kubo et al.
6,873,581 B2 3/2005 Uemura
(Continued)

FOREIGN PATENT DOCUMENTS

JP 02-096935 A 4/1990
JP 07-262579 A 10/1995
(Continued)

OTHER PUBLICATIONS

International Search Report for corresponding International Application No. PCT/JP2014/005552 mailed Dec. 2, 2014.
(Continued)

*Primary Examiner* — Brian Butcher
(74) *Attorney, Agent, or Firm* — Renner, Otto, Boisselle & Sklar, LLP

(57) ABSTRACT

An optical recording and playback apparatus includes: a light source configured to emit a light beam; a tracking mirror configured to change a direction of the light beam; a collimator configured to form the light beam into a parallel light beam; an objective lens configured to collect the parallel light beam to the optical tape; a lens actuator configured to adjust a position of the objective lens in a focus direction of the optical tape and a position of the objective lens in a tracking direction of the optical tape; a polarization hologram plate configured to separate a reflected light beam of the light beam; a photodetector receiving elements configured to receive the plurality of light fluxes; and a control circuit configured to control the lens actuator and the tracking mirror. The tracking mirror is disposed near the light source, and movable in the tracking direction.

6 Claims, 21 Drawing Sheets

(51) Int. Cl.
*G11B 7/003* (2006.01)
*G11B 7/24009* (2013.01)
*G11B 7/1362* (2012.01)
*G11B 7/13* (2012.01)
*G11B 7/1353* (2012.01)
*G11B 7/00* (2006.01)

(52) U.S. Cl.
CPC .............. *G11B7/1353* (2013.01); *G11B 7/1362* (2013.01); *G11B 2007/0003* (2013.01)

(56) References Cited

U.S. PATENT DOCUMENTS

| | | | |
|---|---|---|---|
| 7,227,819 B2 * | 6/2007 | Kadowaki et al. | 369/44.41 |
| 2002/0181382 A1 * | 12/2002 | Oakley | 369/97 |
| 2012/0320727 A1 * | 12/2012 | Matsumiya et al. | 369/112.03 |
| 2013/0094338 A1 | 4/2013 | Saitoh et al. | |

FOREIGN PATENT DOCUMENTS

| | | |
|---|---|---|
| JP | 2000-276744 A | 10/2000 |
| JP | 2002-163831 A | 6/2002 |
| JP | 2004-110895 A | 4/2004 |
| JP | 2005-259239 A | 9/2005 |
| JP | 2005-302243 A | 10/2005 |
| JP | 2010-211859 A | 9/2010 |
| JP | 2011-165285 A | 8/2011 |
| JP | 2013-101740 A | 5/2013 |

OTHER PUBLICATIONS

Form PCT/ISA/237 for corresponding International Application No. PCT/JP2014/005552 mailed Dec. 2, 2014.

* cited by examiner

OPTICAL RECORDING AND PLAYBACK APPARATUS

BACKGROUND OF THE INVENTION

1. Field of the Invention

The present disclosure relates to an optical recording and playback apparatus that records and plays back information in and from an optical recording medium such as an optical tape.

2. Description of the Related Art

An optical tape apparatus in which the recording or playback is simultaneously performed on an optical tape medium with a plurality of optical pickups by making use of an optical high-density recording technology has been proposed as a recording and playback apparatus suitable for storage application. For example, PTL 1 discloses an example of the optical tape apparatus.

Further, in an optical recording and playback apparatus, it is necessary to properly perform focus control and tracking control during recording and playback operations. Particularly, compared with the focus control, higher accuracy is required in the tracking control of the optical tape apparatus in which the optical tape is used. The tracking control, which is different from an optical disk and suitable for the optical tape, is required in the optical tape apparatus because LTM (Lateral Tape Motion) that is a vibration in a tape width direction exists up to several kHz due to running of the optical tape.

In the storage application, the optical recording and playback apparatus is expected to be used in a data center or the like in which a large amount of data is dealt, and there is a demand for performing continuous operation for a long time or maintaining stably signal quality of the recording or playback for several years. For example, PTL 2 discloses a light source unit that properly records and/or plays back information in and from the optical disk even if aging or an environmental change is generated.

CITATION LIST

Patent Literatures

PTL 1: Unexamined Japanese Patent Publication No. 2013-101740
PTL 2: Unexamined Japanese Patent Publication No. 2005-259239

SUMMARY OF THE INVENTION

In a case where a recording position irradiated with a light beam on the optical tape vibrates at a higher frequency in the optical recording and playback apparatus in which data is recorded by irradiation of the light beam, when an actuator which drives an objective lens or the like that is one of optical systems controlling the irradiation of the light beam lacks thrust, the irradiation of the light beam cannot follow the vibration of the optical tape, and the optical tape cannot stably be irradiated with the light beam.

A tracking mirror is used as the optical system against the high-frequency vibration of the optical tape, and driven by the actuator, which results occasionally in a problem in that a spot in which an image is formed on the optical tape degrades or that an offset of a tracking error signal increases to lead to instability in the tracking control.

Additionally, the signal quality of the recording or playback degrades occasionally due to long continuous running or the aging of the optical tape.

An object of the present disclosure is to provide an optical recording and playback apparatus that performs the recording and playback on an optical storage medium such as the optical tape with higher quality.

The optical recording and playback apparatus of the present disclosure includes: a light source configured to emit a light beam for forming a recording mark in an optical tape or a light beam for reading a state of the recording mark; a tracking mirror configured to change a direction of the light beam emitted from the light source; a collimator configured to form the light beam going through the tracking mirror into a parallel light beam; an objective lens configured to collect the parallel light beam from the collimator to the optical tape; a lens actuator configured to adjust a position of the objective lens in a focus direction of the optical tape and a position of the objective lens in a tracking direction of the optical tape; a polarization hologram plate configured to separate a reflected light beam of the light beam with which the optical tape is irradiated through the objective lens into a plurality of light fluxes; a photodetector having a plurality of light receiving elements configured to receive the plurality of light fluxes; and a control circuit configured to control the lens actuator and the tracking mirror. The tracking mirror is disposed near the light source, and movable in the tracking direction.

The optical recording and playback apparatus of the present disclosure can perform the recording or the like on the optical storage medium such as the optical tape with high quality.

DETAILED DESCRIPTION OF THE PREFERRED EMBODIMENTS

Hereinafter, exemplary embodiments of the present disclosure will be described in detail with reference to the drawings. However, the detailed description beyond necessity is occasionally omitted. For example, the detailed description of the well-known matter or the overlapping description of the substantially same configuration is occasionally omitted. This is because unnecessary redundancy of the following description is avoided for the purpose of the easy understanding of those skilled in the art.

Note that the accompanying drawings and the following description are provided in order that those skilled in the art sufficiently understand the present disclosure, therefore it is intended that claimed subject matter is not limited to the accompanying drawings and the following description.

First Exemplary Embodiment

[1. Configuration of Optical Tape]

Figure 1:
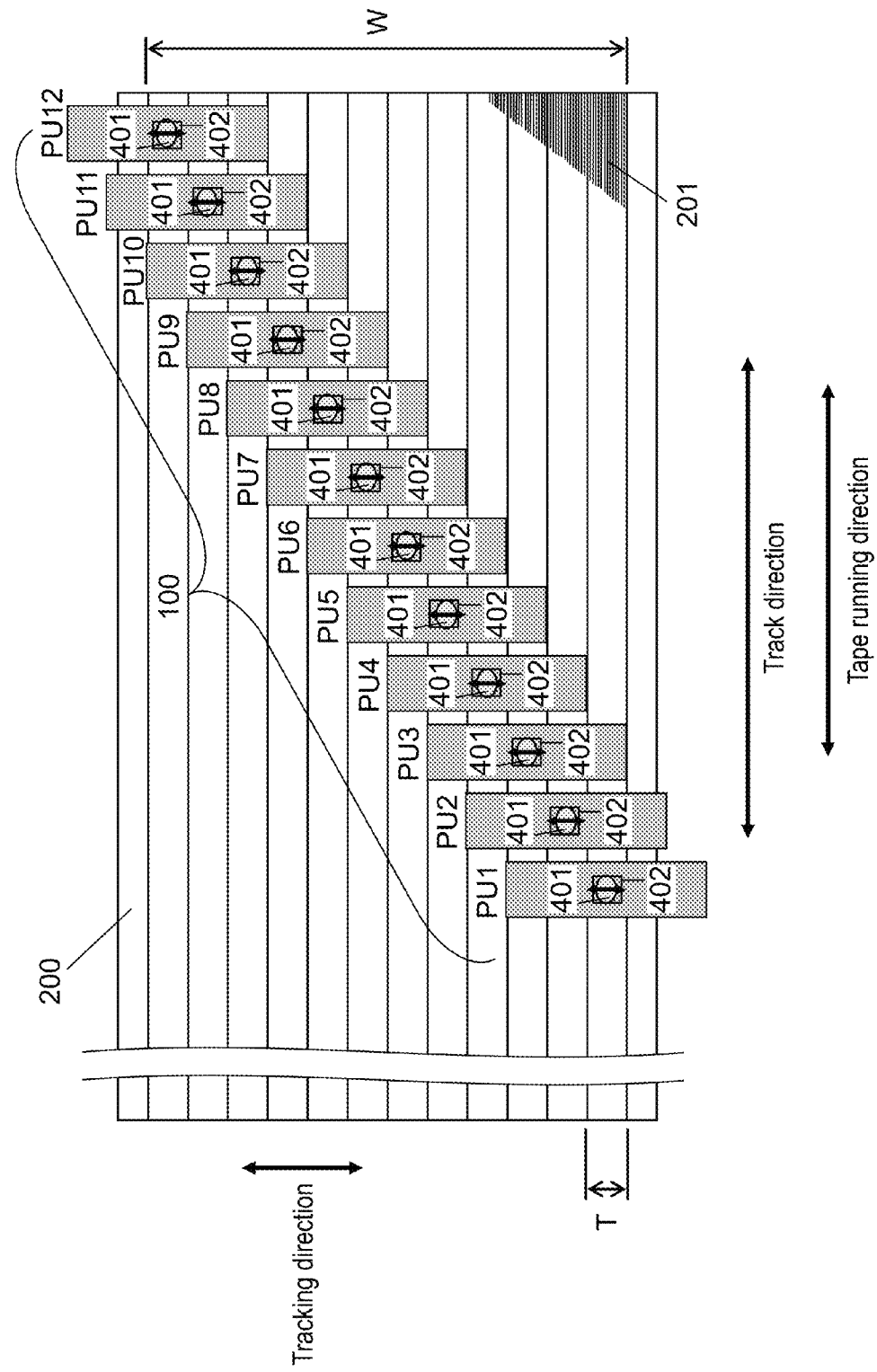
FIG. 1 is a view illustrating a relationship between a pickup of an optical recording and playback apparatus and an optical tape in which information is recorded according to a first exemplary embodiment.

In the present exemplary embodiment, an optical tape is used as an optical recording medium. FIG. 1 is a view illustrating a relationship between pickup 100 of an optical recording and playback apparatus and optical tape 200 in which information is recorded according to the present exemplary embodiment.

The optical recording and playback apparatus of the present exemplary embodiment includes pickup 100. The optical recording and playback apparatus records data in optical tape 200, and plays back the data from optical tape 200.

In FIG. 1, pickup 100 includes 12 pickup units PU1 to PU12. 12 pickup units PU1 to PU12 are arrayed in a direction substantially perpendicular to a track direction that is a tape running direction of optical tape 200. The reason pickup 100 includes a plurality of pickup units is that a data transfer rate to optical tape 200 is enhanced. Pickup units PU1 to PU12 irradiate corresponding recording regions of optical tape 200 with a light beam to record or read the data, respectively.

In the present exemplary embodiment, the 12 pickup units are provided by way of example. However, there is no particular limitation to the number of pickup units.

Optical tape 200 is configured to be able to run in forward and reverse directions. Therefore, after the recording or playback is completed up to an end of optical tape 200, the recording or playback can be continued by reversing a running direction without rewinding optical tape 200 to a head.

In optical tape 200, track 201 is previously transferred to a tape-shaped film with a sub-micron pitch less than 1 μm by a nano-print technology, and a recording layer and a protective layer are laminated on track 201. Track 201 is formed in substantially parallel with the running direction of the tape. Although only a part of track 201 is illustrated in FIG. 1 for the sake of convenience, actually track 201 is formed all over the recording region of optical tape 200. A width W of the recording region of optical tape 200 is set such as in a range of 1 inch to several ½ inch. A thickness of optical tape 200 is set in a range of several μm to several tens of μm, and a depth of a groove constituting the track is set to sub-μm or less.

12 pickup units PU1 to PU12 are fixedly arranged so as to correspond to 12 recording zones into which the recording region of optical tape 200 is divided in a direction perpendicular to a track direction. Therefore, access to the track in each recording zone is obtained by movement of objective lens 401 included in each of pickup units PU1 to PU12. Lens actuator 402 drives objective lens 401 such that objective lens 401 can be shifted in a tracking direction perpendicular to the track direction.

For example, assuming that the recording region has width W of 4.8 mm, width T of each recording zone is 4.8 mm/12=0.4 mm. In this case, it is considered that objective lens 401 can be shifted within a range of ±0.2 mm with a center of the recording zone as an initial position. However, in the present exemplary embodiment, objective lens 401 is configured to be able to be shifted over a long distance up to ±0.3 mm to 0.6 mm in consideration of an error during manufacturing of optical tape 200 or an influence of meandering generated during the tape running. Hereinafter, shifting objective lens 401 toward the tracking direction is referred to as a "lens shift".

Figure 2:
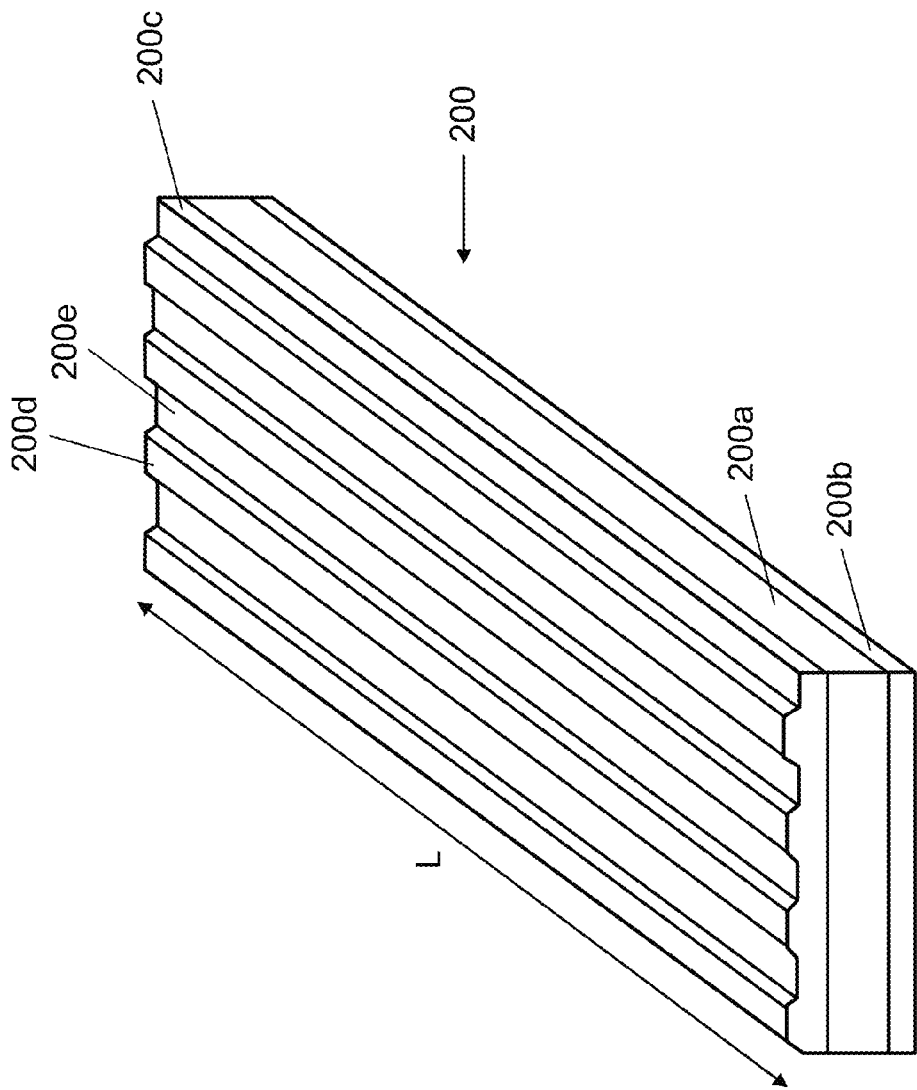
FIG. 2 is an enlarged perspective view schematically illustrating a part of the optical tape in the first exemplary embodiment.

FIG. 2 is an enlarged perspective view schematically illustrating a part of optical tape 200. For example, optical tape 200 includes base film 200a, back coat layer 200b that is bonded to a backside of base film 200a, and inprint layer 200c that is supported by base film 200a. Land 200d and groove 200e are formed in an upper surface of inprint layer 200c. A reflecting film (not illustrated) and a recording material film (not illustrated) are laminated so as to cover the upper surface of inprint layer 200c. A protective film is laminated as needed. Optical tape 200 extends along an elongated direction L, and has a length of, for example, several hundreds of meters.

Scaling in FIG. 2 does not faithfully reflect a size of real optical tape 200. At least several hundreds of lands 200d and grooves 200e are formed in actual optical tape 200. The data is recorded one of or both land 200d and groove 200e. Land 200d or groove 200e in which the data is recorded is referred to as a "track". For example, a pitch of the track is set in a range of 0.2 μm to 0.4 μm. In the following description, it is assumed that the data is recorded in groove 200e. Therefore, the track is occasionally referred to as a "track groove".

Pickup 100 irradiates optical tape 200 with a light beam to form an optical recording mark in a recording material film. Optical characteristics such as a reflectance and a refractive index change between an irradiated region and a remaining region that is a non-irradiated region on optical tape 200. Thus, the recording mark that is the region where the optical characteristic changes is formed in optical tape 200.

In a case where the data is recorded in optical tape 200, optical tape 200 is irradiated with the substantially rectangular light beam in which optical power is modulated according to the data to be recorded, whereby the characteristic of the recording material film is locally changed to write the data. Optical tape 200 is irradiated with the light beam having a given intensity weaker than that during the data recording, and a reflected light beam modulated by optical tape 200 is detected to play back the data recorded in optical tape 200.

In recording and playing back the data in and from optical tape 200, it is necessary that the light beam always become a predetermined convergent state on a target track. Therefore, it is necessary to perform focus control and tracking control. In order to perform the focus control and the tracking control, a focus deviation or a track deviation is detected based on the light beam reflected from optical tape 200, and a position of a light beam spot is adjusted such that the focus deviation or the track deviation is reduced. Levels of the focus deviation and the track deviation are indicated by a focus error signal and a tracking error signal, respectively. The focus error signal and the tracking error signal are generated based on the light beam reflected from optical tape 200. The focus error signal and the tracking error signal are output from a calculator included in pickup 100.

[2. Configuration of Optical Recording and Playback Apparatus]

Figure 3:
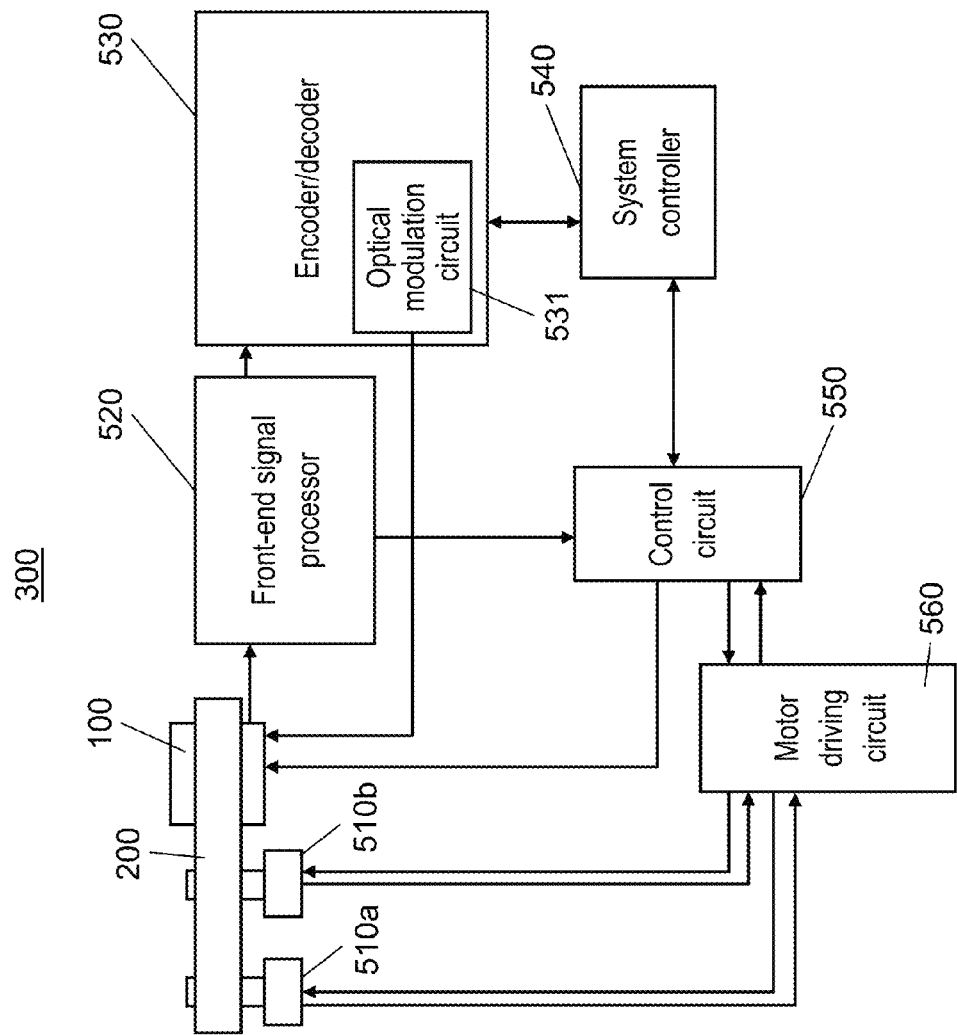
FIG. 3 is a block diagram illustrating the optical recording and playback apparatus of the first exemplary embodiment.

A configuration of the optical recording and playback apparatus will be described below. FIG. 3 is a block diagram illustrating optical recording and playback apparatus 300 of the present exemplary embodiment. Optical recording and playback apparatus 300 includes motors 510a and 510b, front-end signal processor 520 that is electrically connected to motors 510a and 510b, encoder/decoder 530, control circuit 550, motor driving circuit 560, and system controller 540. Motors 510a and 510b cause pickup 100 that is a set of the plurality of pickup units PU1 to PU12, and optical tape 200 to run.

Outputs of pickup units PU1 to PU12 are transmitted to encoder/decoder 530 through front-end signal processor 520.

In reading the data, encoder/decoder 530 decodes the data recorded in optical tape 200 based on signals obtained by pickup units PU1 to PU12. Encoder/decoder 530 includes optical modulation circuit 531. In writing the data, encoder/decoder 530 encodes the data to generate an optical driving signal that is a signal to be written in optical tape 200 by optical modulation circuit 531. The optical driving signal generated by optical modulation circuit 531 is input to pickup units PU1 to PU12. The optical driving signal modulates the intensities of the light beams emitted from light sources of pickup units PU1 to PU12 such that the desired recording mark is formed on the track of optical tape 200.

Front-end signal processor 520 generates a playback signal based on the outputs of pickup units PU1 to PU12. Front-end signal processor 520 also generates a focus error signal and a tracking error signal based on the outputs of pickup units PU1 to PU12. The generated playback signal is transmitted to encoder/decoder 530, and the focus error signal and the tracking error signal are transmitted to control circuit 550.

Control circuit 550 controls motors 510a and 510b through motor driving circuit 560. Control circuit 550 controls lens actuators 402 in pickup units PU1 to PU12 to adjust the positions of objective lenses 401.

Encoder/decoder 530 and control circuit 550 are controlled by system controller 540. The configuration in FIG. 3 can be implemented by mounting, for example, an integrated circuit element constituting each unit and an electronic component such as a memory on a circuit board.

[3. Configuration of Pickup Unit]

Figure 4:
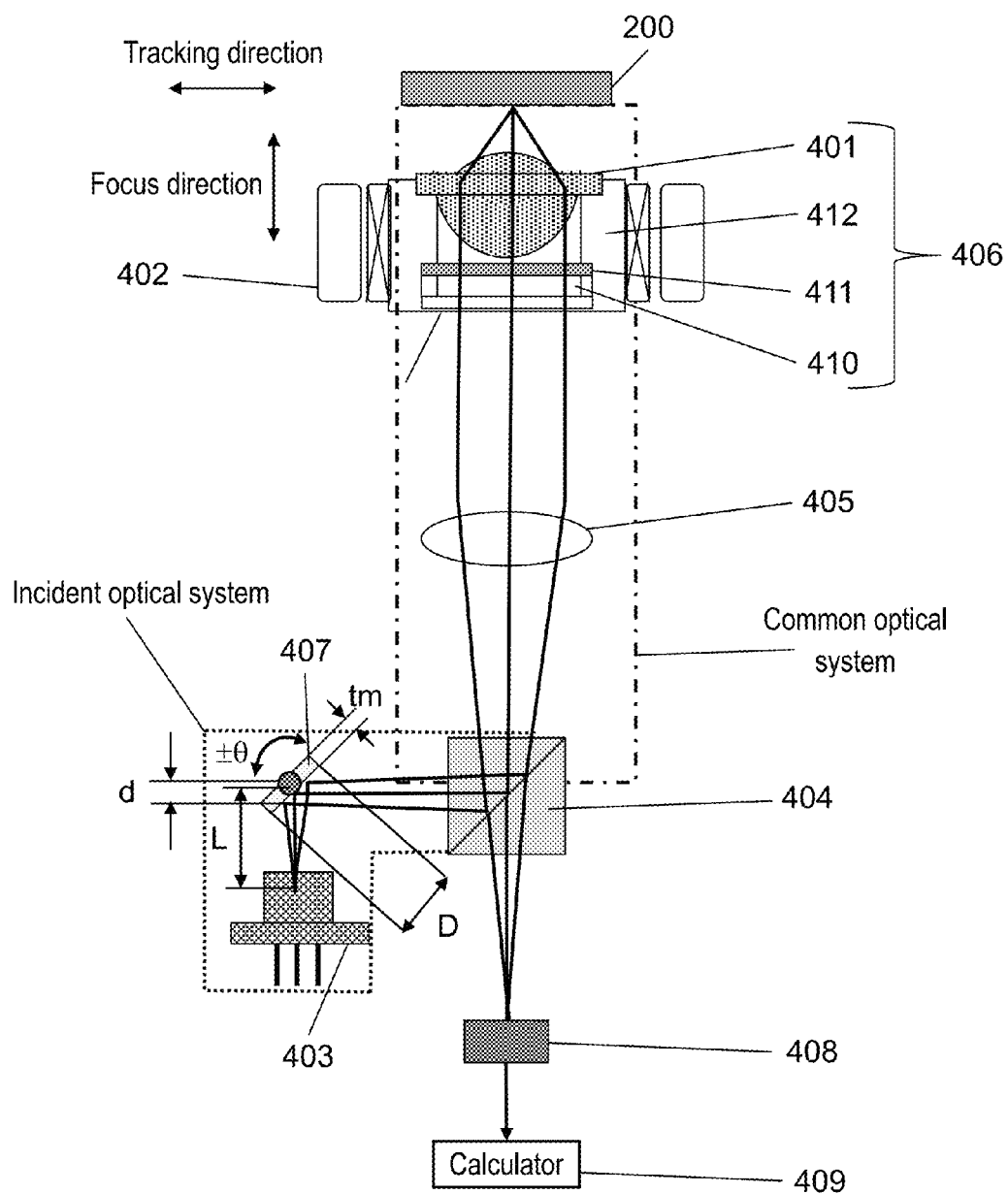
FIG. 4 is a view illustrating an optical configuration of a pickup unit constituting the pickup of the first exemplary embodiment.

Configurations of pickup units PU1 to PU12 will be described below. Since all pickup units PU1 to PU12 have the identical configuration, the configuration of pickup unit PU1 will representatively be described. FIG. 4 is a view illustrating an optical configuration of pickup unit PU1 constituting pickup 100.

Pickup unit PU1 includes light source 403, beam splitter 404, collimator 405, objective lens unit 406, tracking mirror 407, lens actuator 402, photodetector 408, and calculator 409.

Objective lens unit 406 includes objective lens 401, polarization hologram plate 410, quarter-wave plate 411, and objective lens holder 412 that holds objective lens 401, polarization hologram plate 410, and quarter-wave plate 411.

Light source 403 is a semiconductor laser light source, and emits the intensity-modulated light beam in response to the optical driving signal from optical modulation circuit 531. Therefore, the light beam in which the intensity is modulated according to the data to be recorded is emitted from light source 403.

Beam splitter 404 is an optical element that reflects only the light beam having a specific polarized direction and transmits other light beams. In the present exemplary embodiment, beam splitter 404 includes a reflecting surface. Beam splitter 404 guides, in other words, reflects the light beam emitted from light source 403 to optical tape 200, and guides, in other words, transmits the light beam reflected from optical tape 200 to photodetector 408.

Collimator 405 converts the light beam reflected by beam splitter 404 into a parallel light beam.

Objective lens unit 406 is configured to be movable by lens actuator 402 in the direction perpendicular to a recording surface of optical tape 200, in other words, the direction parallel to the focus direction and the recording surface of optical tape 200, in other words, the direction perpendicular to the track direction that is the tracking direction. Specifically, lens actuator 402 includes a focus coil (not illustrated) that is movable in the focus direction, a tracking coil (not illustrated) that is movable in the tracking direction, and an elastic member (not illustrated) such as a spring or a wire. Using the focus coil, the tracking coil, and the elastic member, objective lens unit 406 is moved according to voltages applied to the focus coil and the tracking coil. Under the control of control circuit 550, lens actuator 402 performs the tracking control and the focus control.

Tracking mirror 407 is disposed in an incident optical system while brought close to light source 403. The an incident optical system is indicated by a dotted line and located between light source 403 and the reflecting surface of beam splitter 404. Therefore, light flux diameter d of tracking mirror 407 that receives the light beam emitted from light source 403 can be decreased, so that tracking mirror size D can be decreased. Tracking mirror 407 is a movable mirror having an operating angle of ±θ degrees in the tracking direction.

Further, desirably tracking mirror 407 is made of a lightweight, high-rigidity single-crystal silicon material in which acceleration is easy to obtain. For example, tracking mirror 407 is a MEMS (Micro Electro Mechanical Systems) mirror produced through a semiconductor process. Desirably a low-power-consumption electrostatic driving or piezoelectric type tracking mirror is used.

As illustrated in FIG. 4, the light beam emitted from light source 403 is reflected by tracking mirror 407 and beam splitter 404, and formed into the parallel light beam by collimator 405. The parallel light beam is a linearly-polarized light beam, and the parallel light beam is incident on polarization hologram plate 410 and transmitted straight through polarization hologram plate 410 without diffraction.

The light beam transmitted through polarization hologram plate 410 is formed into a circularly-polarized light beam by quarter-wave plate 411, and incident to objective lens 401. Objective lens 401 performs recording and playback operations by forming an image of the light beam with which the track on optical tape 200 is irradiated.

The light beam with which optical tape 200 is irradiated is reflected by optical tape 200. The reflected light beam is transmitted through objective lens 401 and quarter-wave plate 411 to become a linearly-polarized wave that is orthogonal to a polarization wave plane of an outward traveling path, in other words, the linearly-polarized wave that is rotated by 90 degrees to the polarization wave plane of the outward traveling path. When the light beam is transmitted through polarization hologram plate 410, the light beam is diffracted according to a hologram pattern, and separated into a plurality of signal detecting light fluxes.

The separated plurality of light fluxes are transmitted through collimator 405 and beam splitter 404, and incident on a plurality of light receiving elements (to be described later) provided in photodetector 408.

Calculator 409 generates the tracking error signal, the focus error signal, and the playback signal based on the light beam incident on the plurality of light receiving elements of photodetector 408.

[4. Configurations of Photodetector and Calculator]

Figure 5:
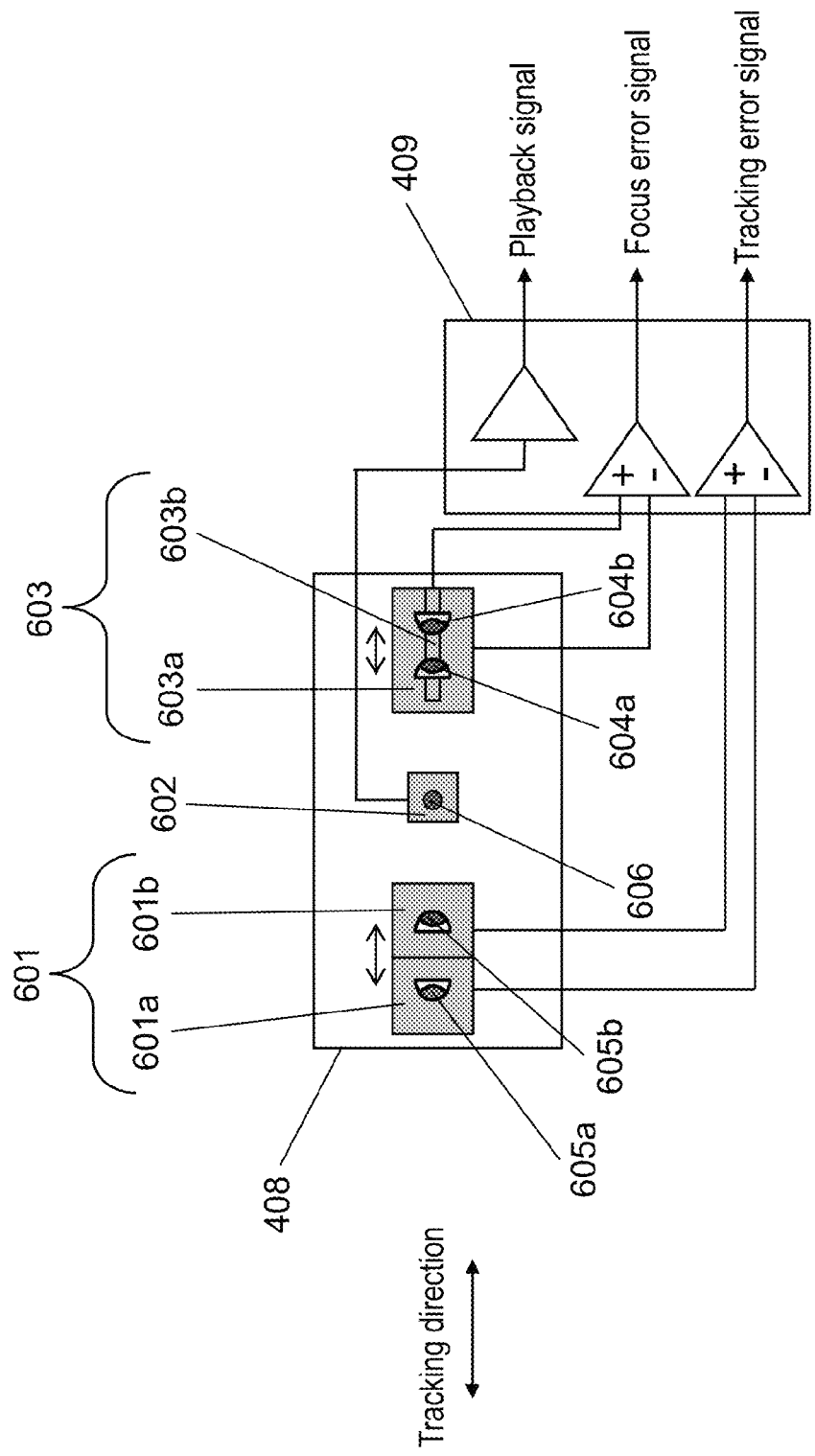
FIG. 5 is a block diagram illustrating a photodetector and a calculator of the first exemplary embodiment.

Configurations of photodetector 408 and calculator 409 will be described below. FIG. 5 is a block diagram illustrating photodetector 408 and calculator 409 of the present exemplary embodiment. Photodetector 408 includes light receiving elements 601, 602, and 603. Using light receiving elements 601, 602, and 603, calculator 409 generates a tracking error signal, a focus error signal, and a playback signal.

A +1st-order light beam diffracted by polarization hologram plate 410 is incident on light receiving element 603. Light receiving element 603 includes light receiving element 603a and light receiving element 603b into which light receiving element 603 is divided. When the light beam reflected from optical tape 200 is incident on light receiving element 603a and light receiving element 603b, spots 604a and 604b are formed in light receiving elements 603a and 603b by the reflected light beam. Calculator 409 generates the focus error signal by a spot size method in which a size of the spot formed in a light receiving element is detected through a differential calculation between outputs of light receiving element 603a and light receiving element 603b.

A −1st-order light beam diffracted by polarization hologram plate 410 is incident on light receiving element 601. Light receiving element 601 includes light receiving element 601a and light receiving element 601b into which light receiving element 601 is divided. When the light beam reflected from optical tape 200 is incident on light receiving element 601 and light receiving element 601b, spot 605a is formed in light receiving element 601a by the reflected light beam, and spot 605b is formed in light receiving element 601b by the reflected light beam. Calculator 409 generates the tracking error signal by an ECFF (Exchanged Correct Far Field) method (to be described later) through a differential calculation between outputs of light receiving element 601a and light receiving element 601b.

A 0-order light beam that is transmitted through polarization hologram plate 410 without diffraction is incident on light receiving element 602. Spot 606 is formed in light receiving element 602 by the reflected light beam. Light receiving element 602 generates the playback signal according to the incident light beam reflected from optical tape 200.

The positions of spots 604a, 604b, 605a, 605b, and 606 formed by the light beam reflected from optical tape 200 on light receiving elements 601 to 603 of photodetector 408 move because tracking mirror 407 is movable at the operating angle of ±θ degree. Specifically, the positions where spots 604a, 604b, 605a, 605b, and 606 are formed are displaced in the tracking direction of optical tape 200. Spots 605a and 605b move in a longitudinal direction of light receiving element 601. Spots 604a and 604b move in the longitudinal direction of light receiving element 603.

At this point, the operating angle of ±θ degrees of tracking mirror 407 is set such that spots 604a, 604b, 605a, 605b, and 606 do not spread out of light receiving regions of light receiving elements 603a, 603b, 602, 601a, and 601b respectively. That is, areas of light receiving elements 603a, 603b, 602, 601a, and 601b are set so as to become larger than movable regions of spots 604a, 604b, 605a, 605b, and 606 respectively. Therefore, a decrease in output of playback signal and a variation in differential level of the focus error signal or tracking error signal can be suppressed even if the positions of spots 604a, 604b, 605a, 605b, and 606 move due to the operation of tracking mirror 407.

The tracking error signal is transmitted from calculator 409 to control circuit 550 through front-end signal processor 520. Control circuit 550 extracts a predetermined high-frequency component from the tracking error signal generated by calculator 409. According to the high-frequency component of the tracking error signal, control circuit 550 determines the control of tracking mirror 407 to drive tracking mirror 407.

Control circuit 550 extracts a predetermined low-frequency component from the tracking error signal generated by calculator 409. According to the low-frequency component of the tracking error signal, control circuit 550 determines the control of lens actuator 402 to drive lens actuator 402.

Control circuit 550 also determines a boundary frequency between the high-frequency component and the low-frequency component, which are extracted from the tracking error signal, from thrust capabilities of lens actuator 402 and tracking mirror 407, a resonant frequency, and an LTM generation situation. For optical tape 200, desirably the separation boundary between the high-frequency component and the low-frequency component is set in a range of 0.7 kHz to 2 kHz.

Figure 6:
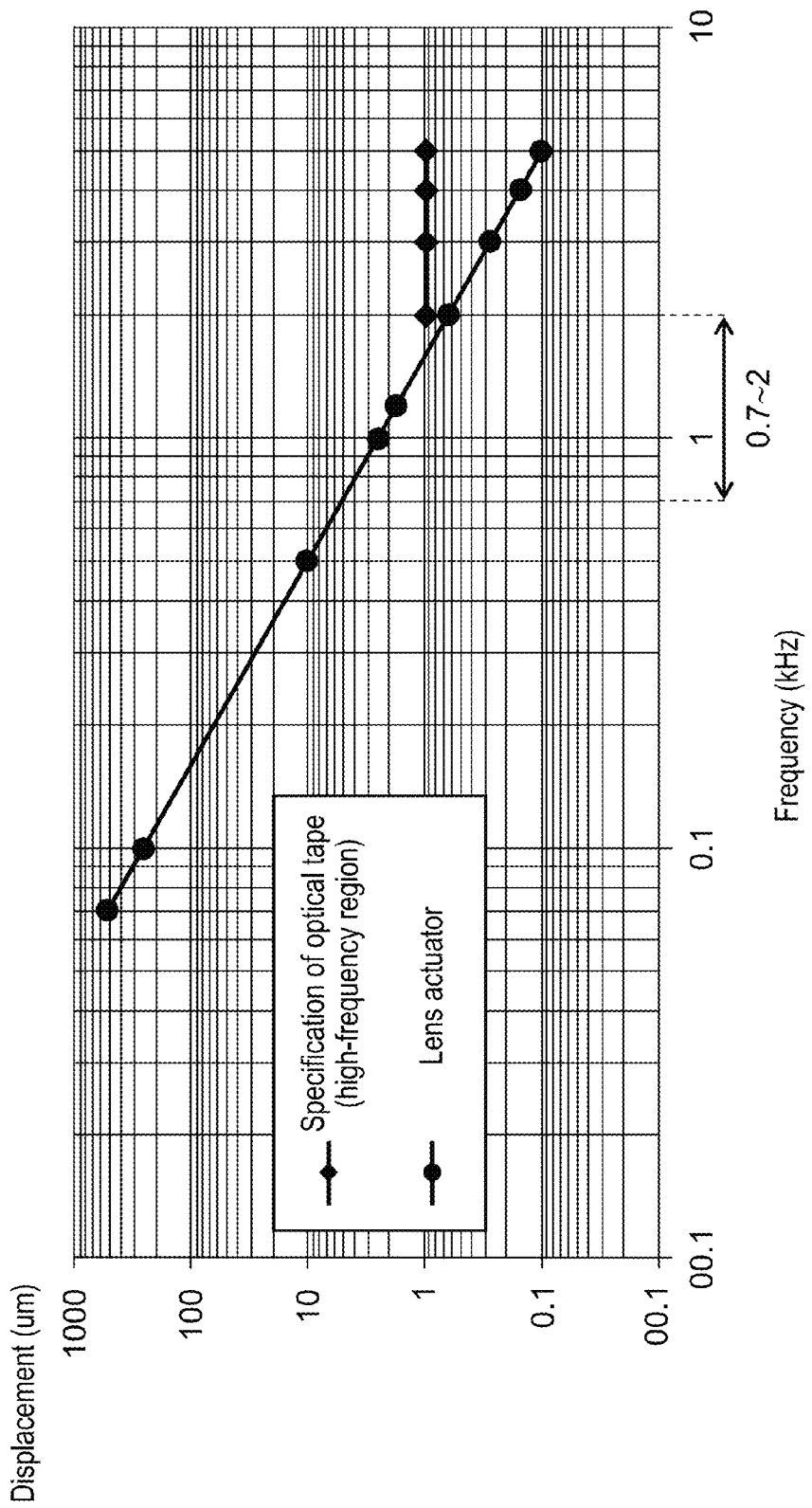
FIG. 6 is a view illustrating a displacement with respect to a frequency at which a lens actuator and the optical tape are operated in the first exemplary embodiment.

FIG. 6 is a view illustrating a displacement with respect to a frequency at which lens actuator 402 and optical tape 200 are operated. A horizontal axis indicates the operating frequency, and a vertical axis indicates the displacement. For optical tape 200, the displacement is indicated only at frequencies greater than or equal to 2 kHz. For lens actuator 402, when the operating frequency is higher than 2 kHz, the displacement becomes less than or equal to 1 um, and there is a possibility of lacking the thrust of lens actuator 402. However, when the operating frequency is higher than 2 kHz, the displacement of optical tape 200 is fixed to 1 um with no variation, and the operation can be performed by the thrust of tracking mirror 407.

Tracking mirror 407 of the present exemplary embodiment is disposed on an optical path near the side of light source 403. In other words, tracking mirror 407 is disposed in not a common optical system indicated by an alternate long and short dash line between the reflecting surface of beam splitter 404 illustrated in FIG. 4 and optical tape 200, but the incident optical system. The reason the region indicated by the alternate long and short dash line is called the common optical system is that both the optical path of the light beam with which optical tape 200 is irradiated and the optical path of the returning light beam reflected from optical tape 200 exist in the region.

An optical distance from light source 403 increases when tracking mirror 407 is disposed in the common optical system. When tracking mirror 407 is disposed in the common optical system, because the light flux in the common optical system is larger than that in the incident optical system, tracking mirror size D of tracking mirror 407 becomes larger compared with the case that tracking mirror 407 is disposed in the incident optical system.

When tracking mirror 407 is enlarged, a weight of tracking mirror 407 increases. Therefore, a force used to drive tracking mirror 407 increases. For the configuration of the present exemplary embodiment, a size of tracking mirror 407 can suitably be reduced compared with the case that tracking mirror 407 is disposed in the common optical system.

[5. Operating Range of Tracking Mirror]

Figure 7:
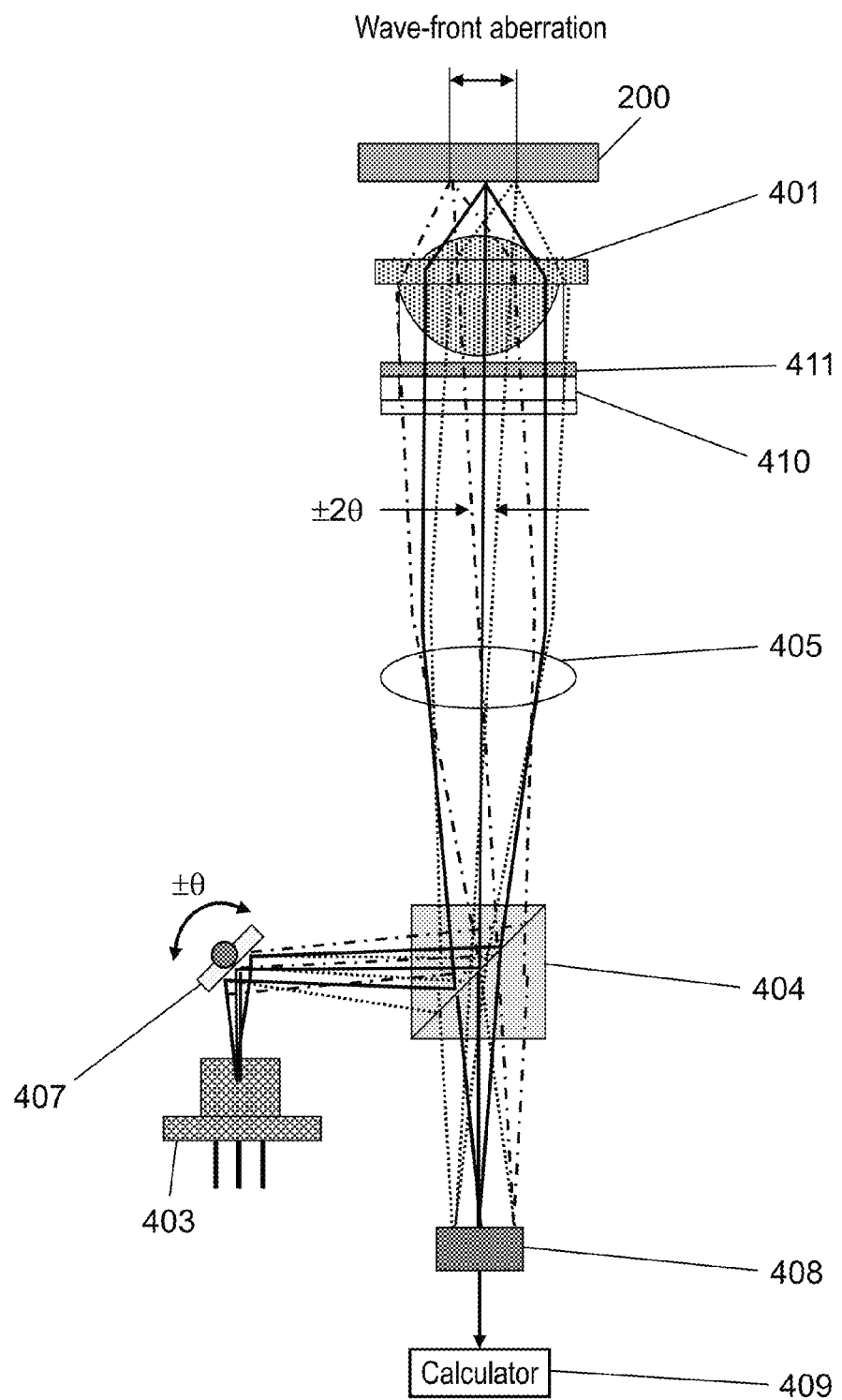
FIG. 7 is a view illustrating operation of a tracking mirror and behavior of a light beam incident on an objective lens in the first exemplary embodiment.

A condition of the operating angle of ±θ degrees of tracking mirror 407 will be described below. FIG. 7 is a view illustrating the operation of tracking mirror 407 and behavior of the light beam incident on objective lens 401. FIG. 7 is a view in which only a configuration necessary for the operation is taken out from PU1 illustrated in FIG. 6. In a case where tracking mirror 407 is operated at the operating angle of ±θ degrees, the light beam is obliquely incident on objective lens 401 by ±2θ degrees. In a case where tracking mirror 407 is operated at the operating angle of +θ degrees in FIG. 7, the behavior of the light beam is illustrated by a dotted line, and the light beam is obliquely incident on objective lens 401 by +2θ degrees. In a case where tracking mirror 407 is operated at the operating angle of 0 degrees, the behavior of the light beam is illustrated by a solid line, and the light beam is incident on objective lens 401 at 0 degrees. In a case where tracking mirror 407 is operated at the operating angle of −θ degrees, the behavior of the light beam is illustrated by an alternate long and short dash line, and the light beam is obliquely incident on objective lens 401 by −2θ degrees. For this reason, a wavefront aberration generated in objective lens 401 increases to possibly degrade the image of the spot.

Inventors found a condition that the generated wavefront aberration does not increase but the image of the spot is hardly degraded even if the light beam is obliquely incident on objective lens 401 by the operating angle of ±θ degrees of tracking mirror 407.

As to specifications of pickup unit PU1, objective lens 401 has a numerical aperture NA of 0.80 to 0.9 and a focal distance fo of 1.0 mm to 1.6 mm, and collimator 405 has a focal distance fc of 12 mm to 18 mm. Light source 403 is a high-density recording blue laser. Optical tape 200 has a track pitch Tp of 0.32 um.

Figure 8:
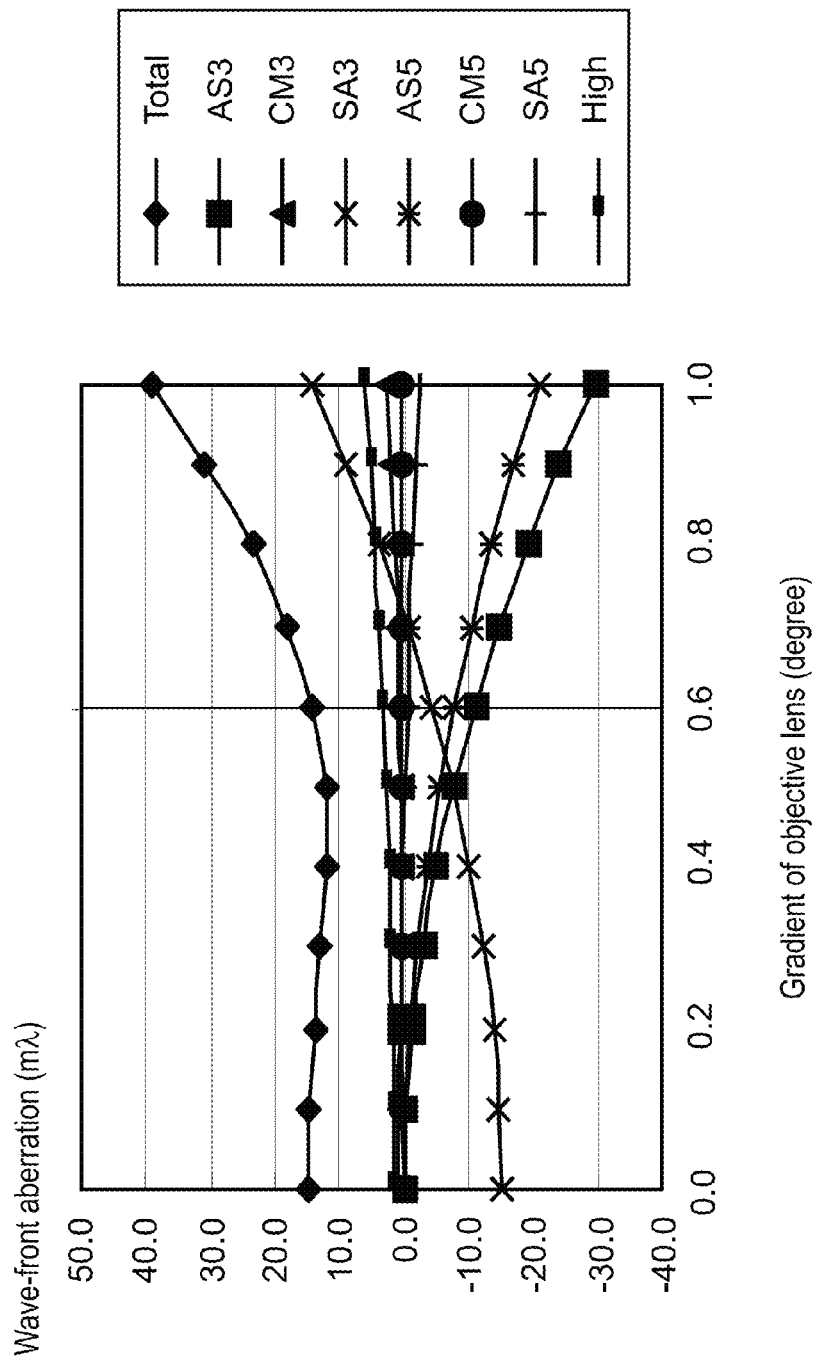
FIG. 8 is a view illustrating a wavefront aberration characteristic when the objective lens of the first exemplary embodiment is designed with one aspherical lens.

FIG. 8 is a view illustrating a wavefront aberration characteristic when objective lens 401 is designed with one aspherical lens. Pickup unit PU1 in which objective lens 401 had the numerical aperture NA of 0.85 and the focal distance fo of 1.2 mm and collimator 405 had the focal distance fc of 15 mm was used.

In FIG. 8, the horizontal axis indicates a gradient of objective lens 401, and the vertical axis indicates the wavefront aberration. In FIG. 8, the wavefront aberration was plotted when the light beam was incident on objective lens 401 at the operating angle of +2θ degrees from 0 degrees to 1 degree with 0.1-degree increments. The wavefront aberration includes 3rd-order astigmatism (AS3), 3rd-order comatic aberration (CM3), 3rd-order spheric aberration (SA3), 5th-order astigmatism (AS5), 5th-order spheric aberration (SA5), high-order aberration (High), and total aberration (Total). These wavefront aberrations are those at the time of designing, and tolerances such as a production error are further added in practice. The production error includes a variation in thickness of the lens and an error or an eccentric error of a surface shape of the lens. It is necessary to hold the wavefront aberration of objective lens 401 below the total aberration of 35 mλ including the production error. Therefore, the wavefront aberration at the time of designing is suitably less than or equal to 20 mλ to 25 mλ.

The wavefront aberration at the time of designing depends substantially on numerical aperture NA and focal distance fo of objective lens 401. Referring to FIG. 8, the total aberration is not large and about 15 mλ until the gradient of +2θ degrees of objective lens 401 becomes 0.6 degrees. That is, when an angle of +2θ degrees obliquely incident on objective lens 401 is less than or equal to 0.6 degrees, the wavefront aberration generated in objective lens 401 does not increase. When tracking mirror 407 is operated while the operating angle of ±θ degrees of tracking mirror 407 is less than or equal to ±0.3 degrees, the spot in which the image is formed on optical tape 200 is stabilized and the signal having the stable quality is obtained during the recording and playback.

Accordingly, for pickup unit PU1 in which objective lens 401 has the numerical aperture of 0.8 to 0.9 and the focal distance of 1.0 mm to 1.6 mm, when tracking mirror 407 is operated while the operating angle of ±θ degrees of tracking mirror 407 is less than or equal to ±0.3 degrees, the spot in which the image is formed on optical tape 200 is stabilized and the signal having the stable quality is obtained during the recording and playback.

[6. Tracking Mirror Size]

Figure 9:
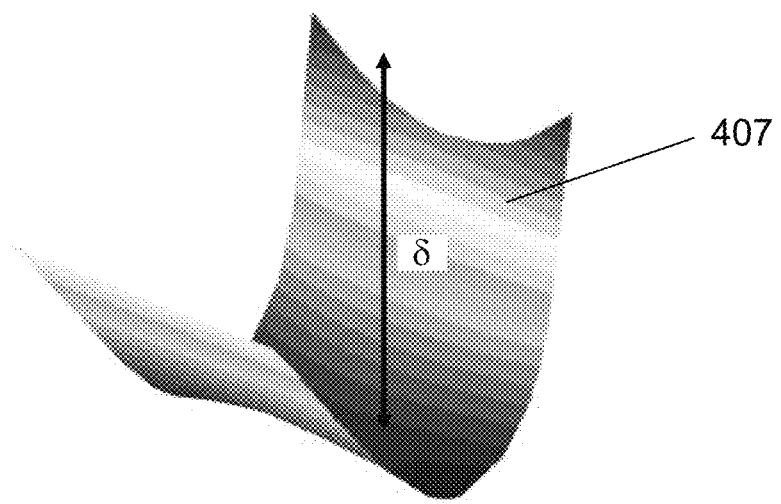
FIG. 9 is a view illustrating a deformation of a tracking mirror of the first exemplary embodiment.

A condition of tracking mirror size D will be described below. FIG. 9 is a view illustrating a deformation of tracking mirror 407. When tracking mirror 407 is operated with a high acceleration, tracking mirror 407 is deformed and deflected as illustrated in FIG. 9. Assuming that δ is a deflection amount of tracking mirror 407, the wavefront aberration is generated according to deflection amount δ. In the light beam reflected by deformed tracking mirror 407, the wavefront aberration increases with increasing deflection amount δ, and the spot in which the image is formed is possibly degraded.

A relationship between deflection amount δ of tracking mirror 407 and thickness tm or tracking mirror size D of tracking mirror 407 is simulated to find an applicable condition for tracking mirror 407 having smaller deflection amount δ and pickup units PU1 to PU12.

Figure 10:
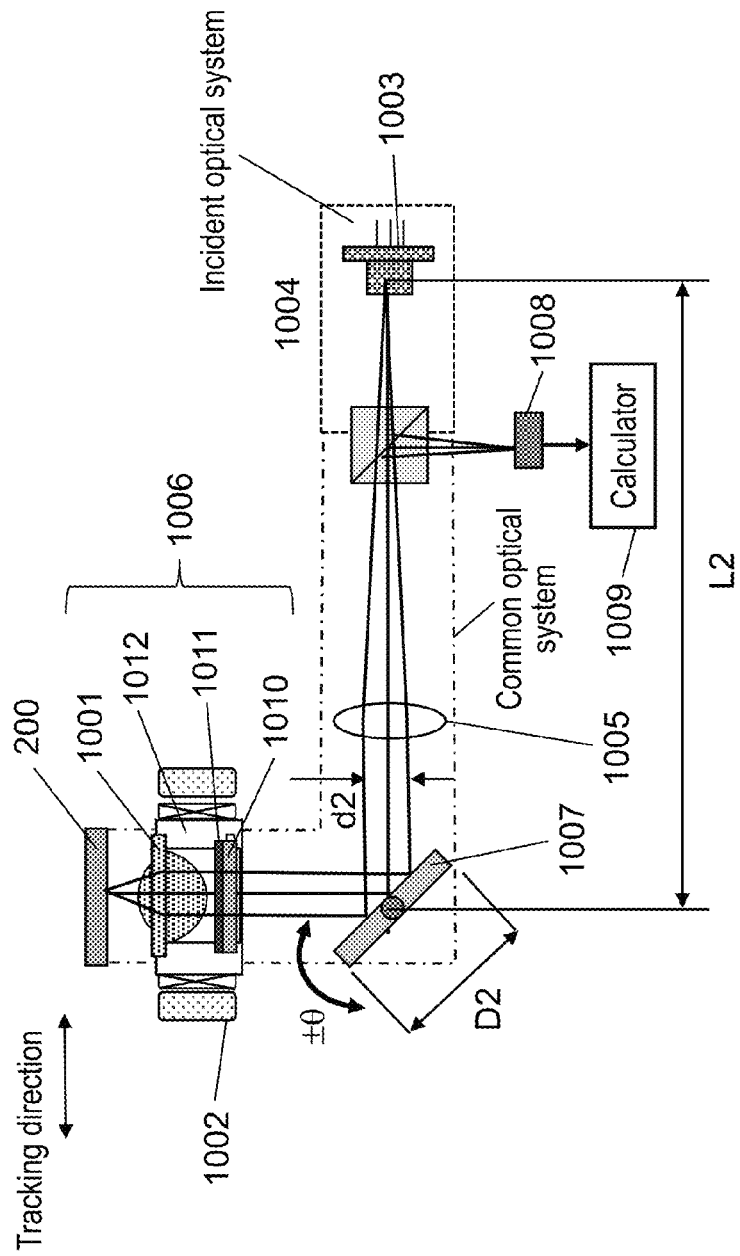
FIG. 10 is a view illustrating an optical configuration of the pickup unit in which the tracking mirror of the first exemplary embodiment is disposed in a common optical system.

FIG. 10 is a view illustrating an optical configuration of pickup unit PU20 in which the tracking mirror is disposed in the common optical system. Pickup unit PU20 includes light source 1003, beam splitter 1004, collimator 1005, objective lens unit 1006, tracking mirror 1007, lens actuator 1002, photodetector 1008, and calculator 1009.

Objective lens unit 1006 includes objective lens 1001, polarization hologram plate 1010, quarter-wave plate 1011, and objective lens holder 1012 that holds objective lens 1001, polarization hologram plate 1010, and quarter-wave plate 1011. Pickup unit PU20 in FIG. 10 differs from pickup unit PU1 illustrated in FIG. 4 in that tracking mirror 1007 is disposed between collimator 1005 and objective lens unit 1006 in the common optical system, and the function of each unit is identical to that of pickup unit PU1 illustrated in FIG. 4.

In the case where tracking mirror 1007 is disposed in the common optical system as illustrated in FIG. 10, light flux diameter d2 increases on tracking mirror 1007 because tracking mirror 1007 is located distant from light source 1003. As to specifications of pickup unit PU20, objective lens 1001 has the numerical aperture NA of 0.85 to 0.9 and the focal distance fo of 1.0 mm to 1.6 mm, and collimator 1005 has the focal distance fc of 12 mm to 18 mm. Light source 1003 is a high-density recording blue laser. Further, distance L2 from light source 1003 to tracking mirror 1007 is set to 15 mm.

Pickup unit PU20 in which objective lens 1001 had the numerical aperture NA of 0.85 and the focal distance fo of 1.2 mm and collimator 1005 had the focal distance fc of 15 mm was used.

As illustrated in FIG. 10, in the case where tracking mirror 1007 is disposed at the position where the light beam formed into the parallel light beam by collimator 1005 is reflected, tracking mirror size D2 depends on a variation in position of light flux diameter d2 and an arrangement error of each optical component. Because the light flux diameter is 2NAfo, light flux diameter d2 of 2.04 mm is obtained. When a lens shift amount of objective lens 1001 is set to ±0.5 mm for the purpose of tracking, the lens shift amount becomes 1 mm in total. When a positioning error of tracking mirror 1007 and an optical axis error of light source 1003 are set to ±0.15 mm, the positioning error and the optical axis error become 0.3 mm in total. A total of light flux diameter d2, the lens shift amount, and the positioning error and the optical axis error becomes 3.34 mm. Because tracking mirror 1007 is obliquely disposed by 45 degrees with respect to light source 1003, $\sqrt{2}$ times tracking mirror size D2 is required. Accordingly, tracking mirror size D2 of 4.8 mm is obtained.

Tracking mirror 407 of pickup unit PU1 illustrated in FIG. 4 is disposed near light source 403 in the incident optical system. When distance L from light source 403 to tracking mirror 407 is set to 2 mm, tracking mirror 407 has size D of 1 mm. Because light flux diameter d becomes L/fc times light flux diameter d2 of pickup unit 20 in FIG. 10, light flux diameter d becomes 0.27 mm. Because the lens shift amount of objective lens 401 is L/fc times ±0.5 mm for the purpose of tracking, the lens shift amount becomes ±0.065 mm, and becomes 0.13 mm in total. When the positioning error of tracking mirror 407 and the optical axis error of light source 403 are set to ±0.15 mm, the positioning error and the optical axis error become 0.3 mm in total. The total of light flux diameter d, the lens shift amount, and the positioning error and the optical axis error becomes 0.7 mm. Because tracking mirror 407 is obliquely disposed by 45 degrees with respect to light source 403, $\sqrt{2}$ times tracking mirror size D is required, and tracking mirror size D of 1 mm is obtained.

Figure 11:
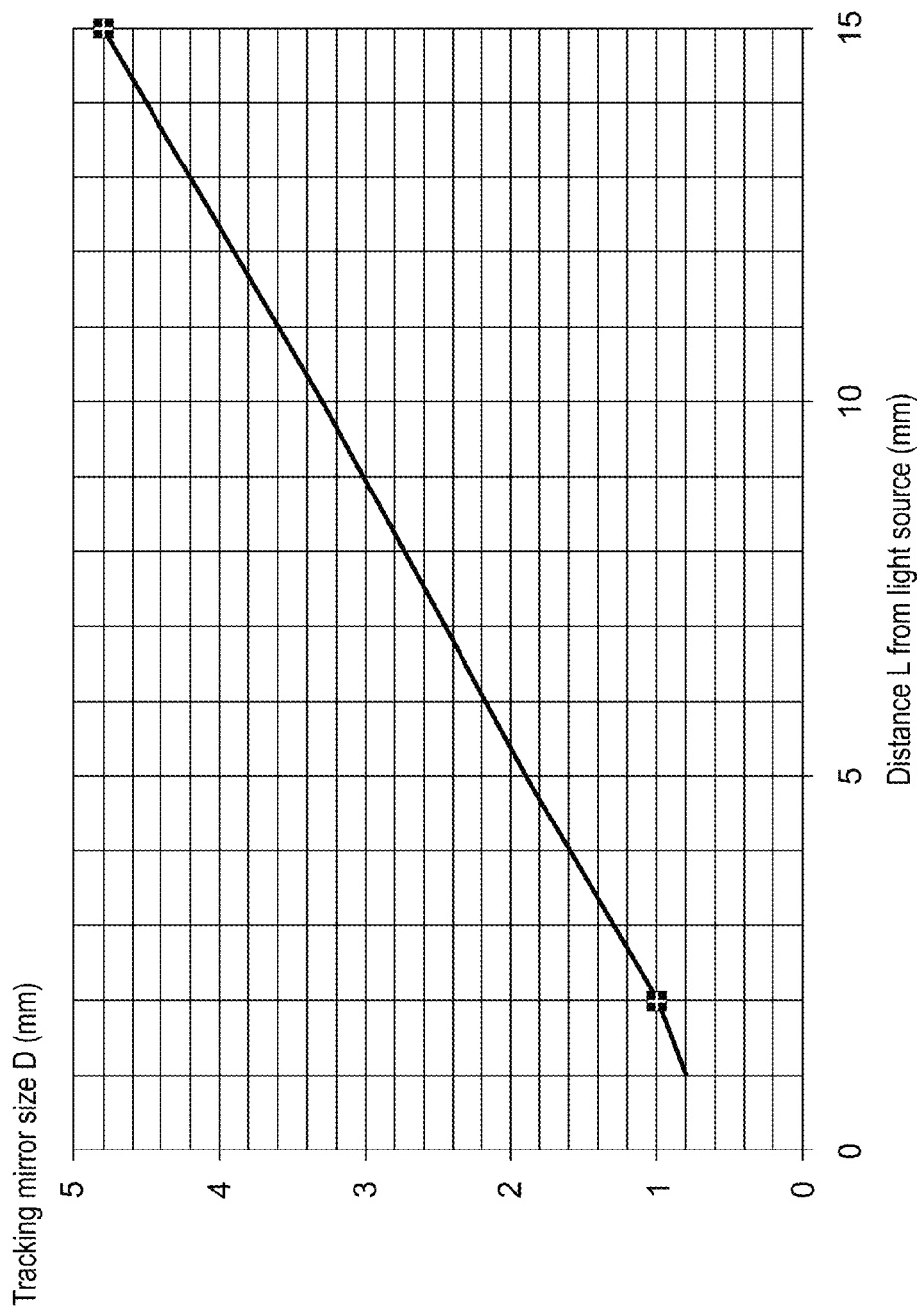
FIG. 11 is a view illustrating a relationship between a distance from a light source and a tracking mirror size in the first exemplary embodiment.

According to the above description, FIG. 11 illustrates a relationship between the distance from the light source and the tracking mirror size. In FIG. 11, the horizontal axis indicates the distance from the light source, and the vertical axis indicates the tracking mirror size.

Deflection amount δ will be described below. The acceleration is applied to tracking mirror 407 during turning of tracking mirror 407. Tracking mirror 407 is deformed according to a level of the acceleration. Maximum value max of deflection amount δ generated by the deformation can be expressed by [Formula 1].

$$\delta \max = 0.217 \frac{\rho f^2 D^5 \theta}{E t_m^2} \quad \text{[Formula 1]}$$

Where ρ is density, f is a turning frequency, D is a tracking mirror size, E is a Young's modulus, tm is a tracking mirror thickness, and θ is a turning angle of the tracking mirror.

Figure 12:
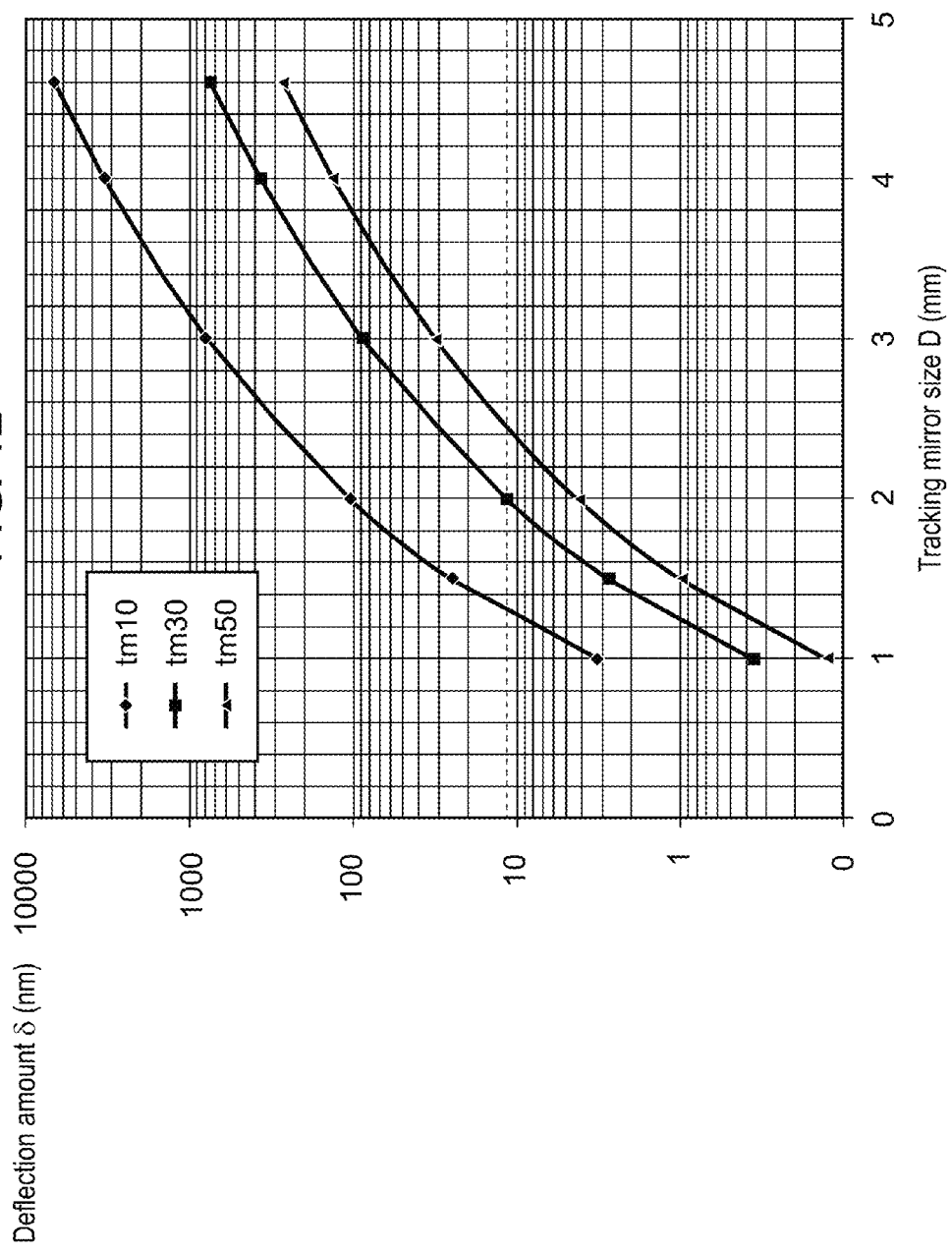
FIG. 12 is a view illustrating a relationship between a tracking mirror size and a deflection amount in the first exemplary embodiment.

At this point, when turning frequency f is set to 5 kHz, turning angle θ is set to 0.025 degrees=0.44 mrad, and tracking mirror 407 is made of a silicon material, the silicon material has Young's modulus E of 169 GPa, and the silicon material has density ρ of 2.33 g/cm³. In this case, FIG. 12 illustrates a relationship between tracking mirror size D and deflection amount δ for thicknesses tm of 10, 30, and 50 um of tracking mirror 407. In FIG. 12, the horizontal axis indicates tracking mirror size D, and the vertical axis indicates deflection amount δ.

Because deflection amount δ is proportional to a fifth power of tracking mirror size D from (Formula 1), tracking mirror size D of 1 mm differs from tracking mirror size D of 4.8 mm in the deflection amount of the fifth power of 4.8, in other words, about 2500 times. The reduction of tracking mirror size D is necessary for suppressing the deflection amount of tracking mirror 407.

In consideration of the use of tracking mirror 407 in the reflection, a permissible value of the deflection amount of tracking mirror 407 is strictly set to 10 mλ in an RMS (Root Mean Square) wavefront aberration. That is, a P-V (Peak to Valley) wavefront aberration becomes triple the RMS wavefront aberration, deflection amount δ becomes 30 mλ. When light source wavelength λ is set to 405 nm, it is necessary that deflection amount δ be less than or equal to 12 nm. In FIG. 12, tracking mirror size D is less than or equal to 1.3 mm in order to obtain deflection amount δ of 12 nm or less for thickness tm of 10 um, tracking mirror size D is less than or equal to 2.0 mm in order to obtain deflection amount δ of 12 nm or less for thickness tm of 30 um, and tracking mirror size D is less than or equal to 2.4 mm in order to obtain deflection amount δ of 12 nm or less for thickness tm of 50 um.

Usually the MEMS mirror having the thickness of about 10 um to about 30 um is frequently used because of easiness of the production. In a case where the MEMS mirror is thickened, for example, for an electrostatic type MEMS mirror, a comb pattern width is set as narrow as about 5 um. Because an aspect ratio is desirably less than or equal to 10 because of a difficulty level of the production, the thickness of the MEMS mirror is set up to about 50 um.

In order to obtain deflection amount δ of 12 nm or less, distance L from the light source to the tracking mirror is less than or equal to 3 mm for tracking mirror size D of 1.3 mm or less with respect to thickness tm of 10 um in FIG. 11, distance L is less than or equal to 5 mm for tracking mirror size D of 2.0 mm or less with respect to thickness tm of 30 um, and distance L is less than or equal to 6.5 mm for tracking mirror size D of 2.4 mm or less with respect to thickness tm of 50 um.

Therefore, in order that the degradation of the wavefront aberration is suppressed to fall within a practical range even if the tracking mirror 407 is deformed due to the turning with a high acceleration, it is necessary that tracking mirror size D be less than or equal to 2.0 mm for mirror thickness tm of 10 to 30 um, and that tracking mirror size D be less than or equal to 2.4 mm for mirror thickness tm of 50 um. In order to dispose tracking mirror 407 in the pickup unit, it is necessary that distance L from light source 403 to tracking mirror 407 be less than or equal to 5 mm for mirror thickness tm of 10 to 30 um, and that distance L from light source 403 to tracking mirror 407 be less than or equal to 6.5 mm for mirror thickness tm of 50 um.

When tracking mirror 407 is configured under the above conditions, the deformation of tracking mirror 407 is suppressed even at the acceleration of 1000 m/S² in response to the high frequency in the LTM, and the high-quality recording and playback signal can be obtained without degrading the wavefront of the spot.

[7. Tracking Error Signal Generating Method]

A tracking error signal generating method performed by photodetector 408 and calculator 409 will be described below.

Because the light beam polarized by tracking mirror 407 is obliquely incident on objective lens 401 by ±2θ degrees, the center of the light flux deviates depending on the distance between tracking mirror 407 and objective lens 401. When the light beam reflected from optical tape 200 is obliquely taken in objective lens 401, the deviation is also generated in the pattern of the reflected light beam. Therefore, an offset (hereinafter, referred to as a TE offset) is generated in the tracking signal, and the tracking control becomes unstable.

An optimum method for the tracking error signal generating method was found.

Figure 13:
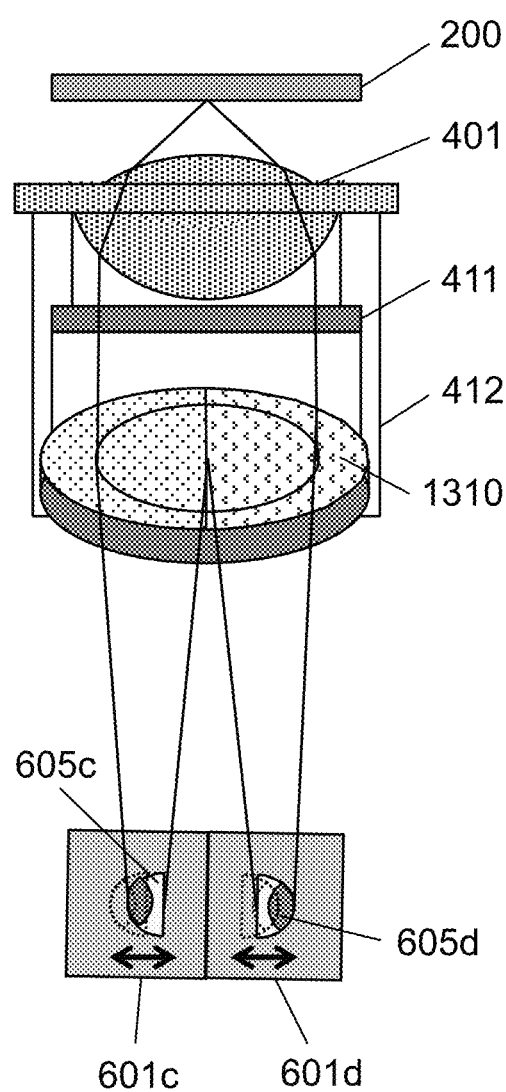
FIG. 13 is a view illustrating a CFF method in the first exemplary embodiment.

FIG. 13 is a view illustrating a CFF (Correct Far Field) method that is one of the tracking error signal generating methods. In FIG. 13, only the configuration involving the generation of the tracking error signal is taken out from the configurations of the pickup. The light beam reflected from optical tape 200 is transmitted through quarter-wave plate 411, then is converted into the polarization plane orthogonal to the incident light beam, and separated into two light fluxes by polarization hologram plate 1310. The separated light fluxes are incident on light receiving elements 601c and 601d, and are received while spots 605c and 605d are formed. In the CFF method, tracking error signal TE is generated from TE=X1−X2. Where X1 is an output of light receiving element 601c and X2 is an output of light receiving element 601d. In the CFF method, because objective lens 401, quarter-wave plate 411, and polarization hologram plate 1310 move integrally, the light beam reflected from optical tape 200 is divided into two at the center of the reflected light beam even if objective lens 401 moves, and the light beam is configured so as not to spread out of each surface of light receiving elements 601c and 601d on photodetector 408. The CFF method is hardly influenced by the movement of objective lens 401, and the CFF method has the small TE offset. Therefore, the CFF method is suitable for the pickup having a large moving distance of objective lens 401.

However, in a case where tracking mirror 407 is operated to change the optical axis, occasionally the influence of the optical axis change can hardly be decreased.

Figure 14:
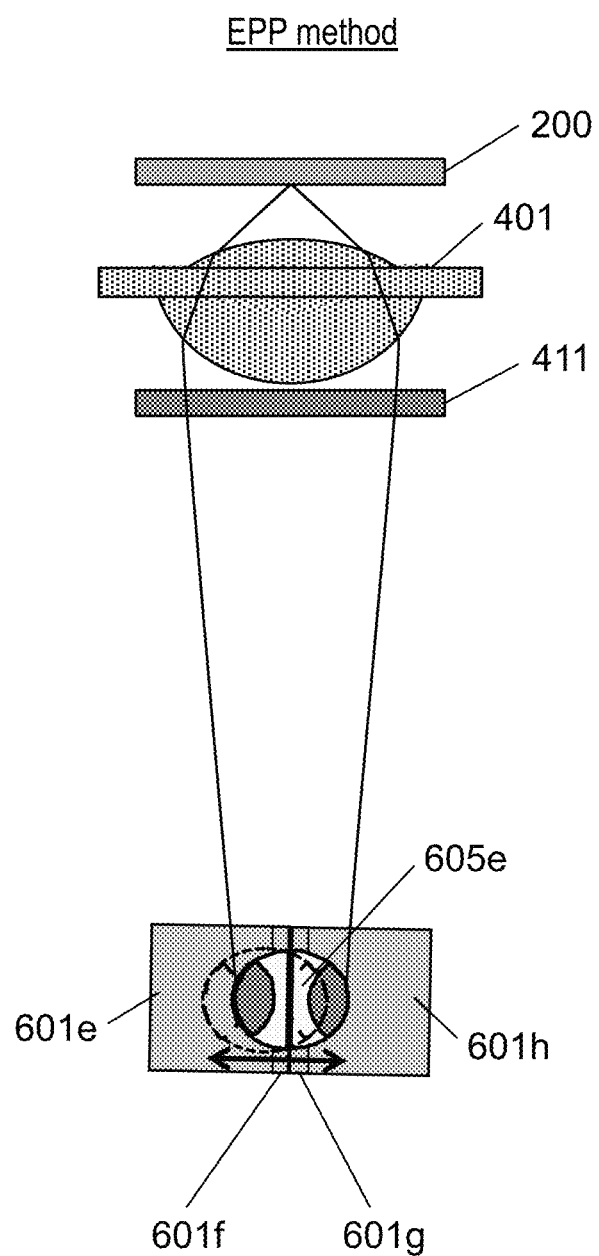
FIG. 14 is a view illustrating an EPP method in the first exemplary embodiment.

FIG. 14 is a view illustrating an EPP (Exchanged Push Pull) method that is one of a tracking error signal generating method. In FIG. 14, only the configuration involving the generation of the tracking error signal is taken out from the configurations of the pickup. The light beam reflected from optical tape 200 is transmitted through quarter-wave plate 411, incident on quartering light receiving elements 601e, 601f, 601g, and 601h, and received as spot 605e.

In the EPP method, tracking error signal TE is generated from TE=(X3+X5)−(X4+X6). Where X3 is an output of light receiving element 601e, X4 is an output of light receiving element 601f, X5 is an output of light receiving element 601g, and X6 is an output of light receiving element 601h. One of features of the EPP method is that polarities of light receiving elements 601e and 601g and polarities of light receiving elements 601f and 601h are different, the TE offset caused by the optical axis change can be decreased. However, in a case where objective lens 401 moves, spot 605e on photodetector 408 moves as illustrated by a broken line, and the output of photodetector 408 changes.

When a component of the diffracted light beam is included in outputs X4 and X5 in a central portion of spot 605e, an amplitude of tracking signal decreases, and the TE offset decreases rapidly. Accordingly, in a case where optical tape 200 moves as large as 500 um equivalent to a quarter of a diameter of spot 605e, the EPP method has a drawback that output X5 of central light receiving element 601g includes the component of the diffracted light beam to increase the TE offset.

Figure 15:
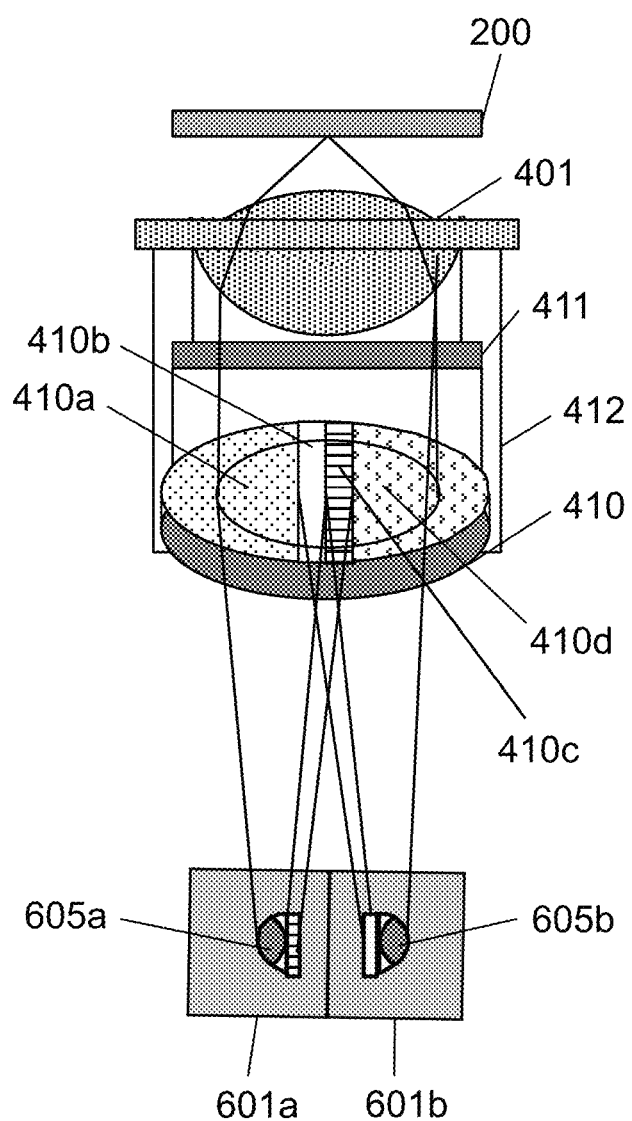
FIG. 15 is a view illustrating an ECFF method in the first exemplary embodiment.

FIG. 15 is a view illustrating an ECFF method that is a tracking error signal generating method. In polarization hologram plate 410, the pattern of polarization hologram plate 1310 in FIG. 13 is changed. Polarization hologram plate 1310 is divided into two in the CFF method, whereas polarization hologram plate 410 is divided into four in the ECFF method. It is assumed that 410a, 410b, 410c, and 410d are pattern regions of polarization hologram plate 410 in FIG. 15. It is assumed that X7 is an output of light receiving element 601a, and that X8 is an output of light receiving element 601b. Pattern regions 410b and 410c in the central portion of the hologram correspond to outputs X4 and X5 in FIG. 14. The light flux of pattern region 410b is replaced with output X8, and the light flux of pattern region 410c is replaced with output X7. In the ECFF method, tracking error signal TE is generated from TE=X7−X8.

In the ECFF method, objective lens 401, quarter-wave plate 411, and polarization hologram plate 410 move integrally. The ECFF method is the tracking error signal generating method having both an advantage of the CFF method that the TE offset can be decreased with respect to the movement of the objective lens and an advantage of the EPP method that the TE offset can be decreased during the optical axis change.

Figure 16:
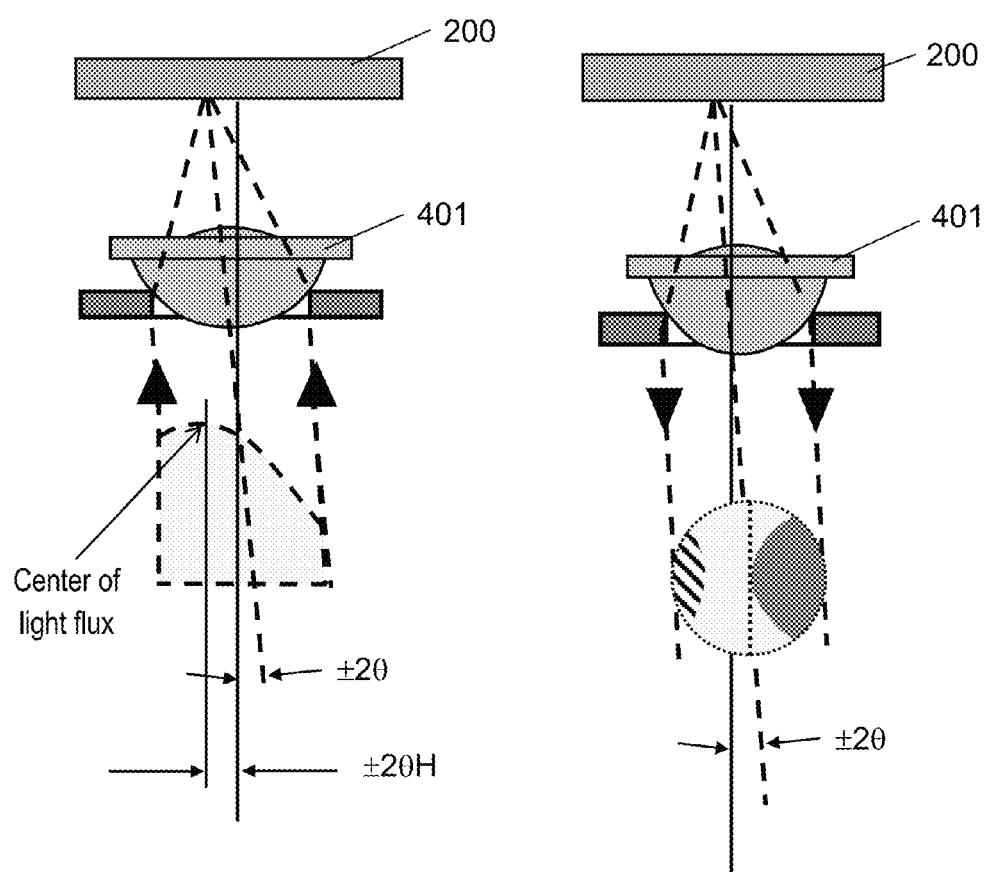
FIG. 16A is a view illustrating a deviation of a light flux incident on the objective lens of the first exemplary embodiment.
FIG. 16B is a view illustrating a deviation of a reflected light beam in the first exemplary embodiment.
Figure 17:
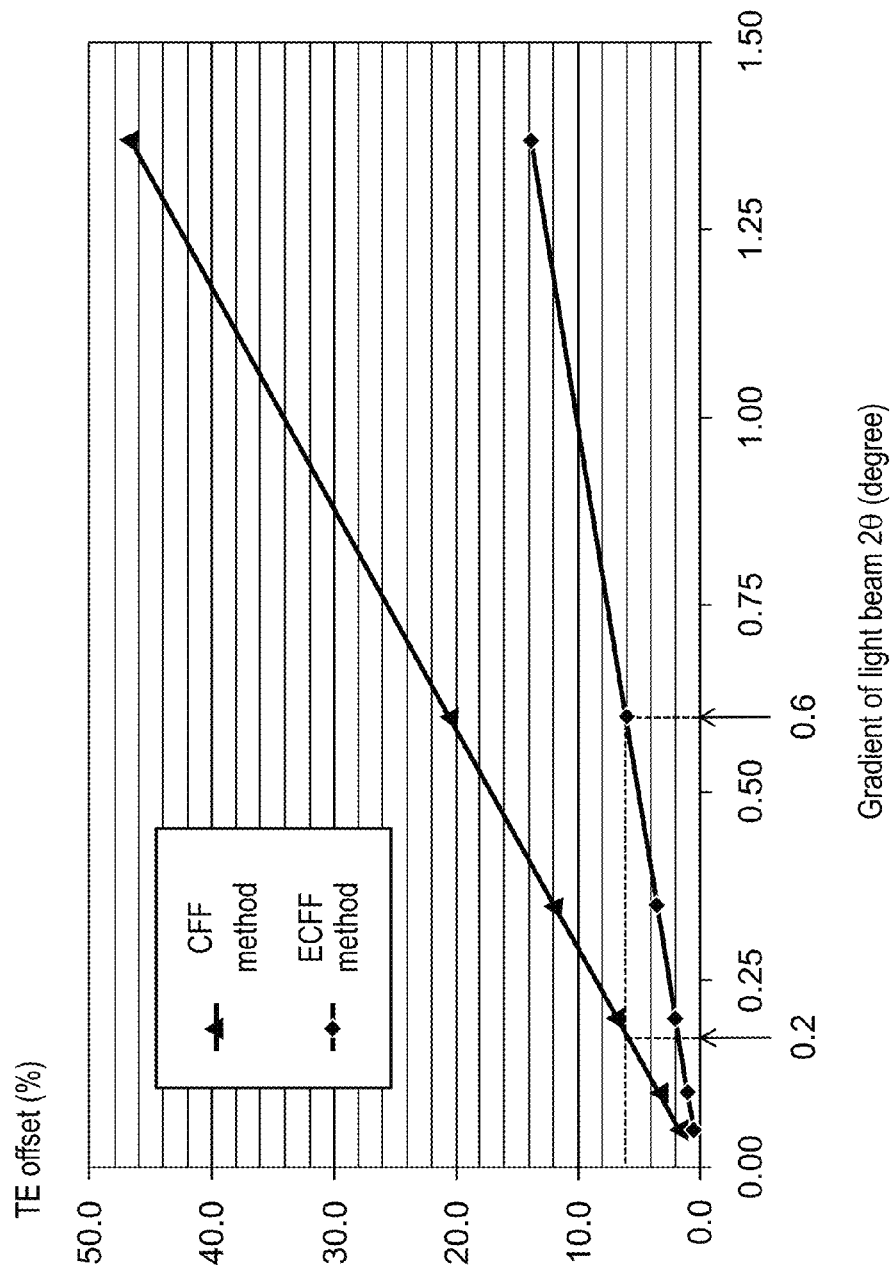
FIG. 17 is a view illustrating a total of a TE offset caused by a deviation of a center of the light flux and a TE offset caused by a pattern deviation of the reflected light beam against a gradient of a polarized light beam with respect to the CFF method and the ECFF method in the first exemplary embodiment.
Figure 18:
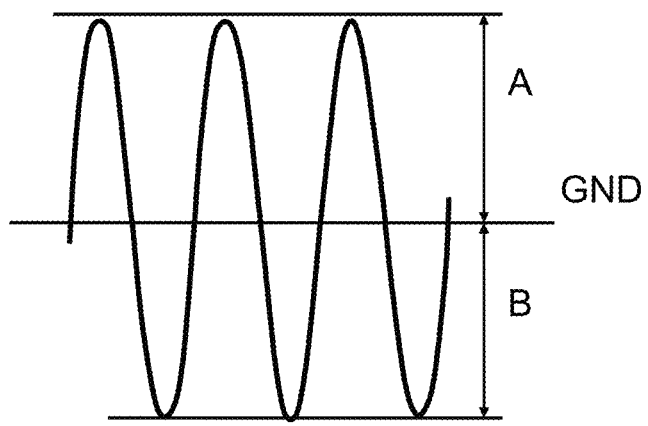
FIG. 18 is a view illustrating a definition of the TE offset in the first exemplary embodiment.

Using the following specification of the pickup unit, a relationship between the optical axis change and the TE offset was calculated with respect to the ECFF method and the CFF method. Wavelength λ was set to 405 nm, the track pitch of optical tape 200 was set to 0.32 um, an occupation ratio of a tracking amplitude component was set to 0.263 when a total light beam output of the light beam reflected from optical tape 200 was set to 100 as a modulation level of the tracking signal after the reflected light beam passes through objective lens 401, the NA number of objective lens 401 was set to 0.85, the focal distance of the objective lens was set to 1.2 mm, the focal distance of the collimator was set to 15 mm, and distance L between tracking mirror 407 and objective lens 401 was set to 19 mm. FIG. 16A is a view illustrating the deviation of the light flux incident on objective lens 401, and FIG. 16B is a view illustrating the deviation of the reflected light beam. As described above with reference to FIG. 7, because the light beam polarized by tracking mirror 407 is obliquely incident on objective lens 401 by ±2θ degrees, the center of the light flux deviates by ±2θH in a far-field pattern. Where H is the distance between tracking mirror 407 and objective lens 401. FIG. 16A illustrates a state, in which the polarized light beam is obliquely incident on objective lens 401 by +2θ degrees and the center of the light flux deviates by +2θH in the far-field pattern. Due to the influence of the oblique incidence by ±2θ degrees, the light beam reflected from optical tape 200 is obliquely taken in objective lens 401 by ±2θ degrees and the deviation is generated in the pattern of the reflected light beam. FIG. 16B illustrates a state, in which the polarized light beam is obliquely incident on objective lens 401 by +2θ degrees and the reflected light beam deviates by +2θ degrees. FIG. 17 is a view illustrating a total of the TE offset caused by the deviation of the center of the light flux and the TE offset caused by the pattern deviation of the reflected light beam for the gradient of the polarized light beam with respect to the CFF method and the ECFF method. FIG. 18 is a view illustrating a definition of the TE offset. FIG. 18 illustrates a waveform of the tracking error signal. In a case where no difference exists between signal amounts in the tracking direction, the tracking error signal having a symmetry with respect to GND is obtained, and A=B holds. On the other hand, in a case where the difference is generated between signal amounts in the tracking direction due to a difference in distribution of the light beam incident on objective lens 401 or the position deviation of the hologram, a DC offset is generated in the tracking error signal, and A≠B is obtained. TE offset is expressed as follows.

$$TE \text{ offset} = \frac{A-B}{2(A+B)} \times 100(\%) \quad \text{[Formula 2]}$$

In FIG. 17, the TE offset increases in proportion to the gradient of 2θ in both the CFF method and the ECFF method. When the TE offset exceeds 20%, the tracking control is starting to become unstable. Because the TE offset is generated by the meandering of the track groove, the vibration in the optical recording and playback apparatus, and the variation in position of the objective lens, an allocation of the TE offset to the operation of tracking mirror 407 is set to 6% or less. In the CFF method, a restriction that the gradient 2θ is less than or equal to 0.2 degrees is imposed in order to set the TE offset to 6% or less. In the ECFF method, the gradient 2θ is less than or equal to 0.6 degrees or less, and becomes three times the CFF method. In the ECFF method, the operating angle θ of tracking mirror 407 becomes 0.3 degrees, and the operating range of tracking mirror 407 can be expanded.

These values coincide with the optical axis gradient ±2θ of ±0.6 degrees derived from the wavefront aberration characteristic of objective lens 401 and operating angle ±θ of ±0.3 degrees of tracking mirror 407.

Second Exemplary Embodiment

In the first exemplary embodiment, the optical recording and playback apparatus is provided with the tracking mirror, and the pickup deals with the high-frequency LTM. The conditions and configurations, which should solve the problems generated during the operation of the tracking mirror in the optical recording and playback apparatus of the first exemplary embodiment, are also described in the first exemplary embodiment. Only one axis in which the light beam is polarized in the tracking direction is operated in the tracking mirror of the first exemplary embodiment. In a tracking mirror according to a second exemplary embodiment, the tracking mirror can be operated in a two-axis manner, in other words, not only the tracking direction but also the track direction.

Generally the optical recording and playback apparatus is aimed at applications of continuously recording and storing the large-capacity data of the data center and the like or applications of backing up the data for one day nightly and quickly accessing and reading the data as needed. Accordingly, it is necessary for the optical recording and playback apparatus to guarantee the continuous operation for several years, and the optical recording and playback apparatus is expected to be able to always record the data with high signal quality and stably read the recorded data.

However, in the conventional optical recording and playback apparatus, there is a problem in that the signal quality is degraded due to the aging and the temperature characteristic, and that the offset is generated in the focus error signal or the tracking error signal. The offset causes the unstable control to interrupt the recording and playback operation. Additionally, the offset generates the error in the focus or tracking control, and the quality degradation of the recording mark or playback signal, such as the degradation of a signal level and a noise increase, is generated due to the enlargement of the spot in which the image is formed on the optical tape or the tracking deviation.

Figure 19:
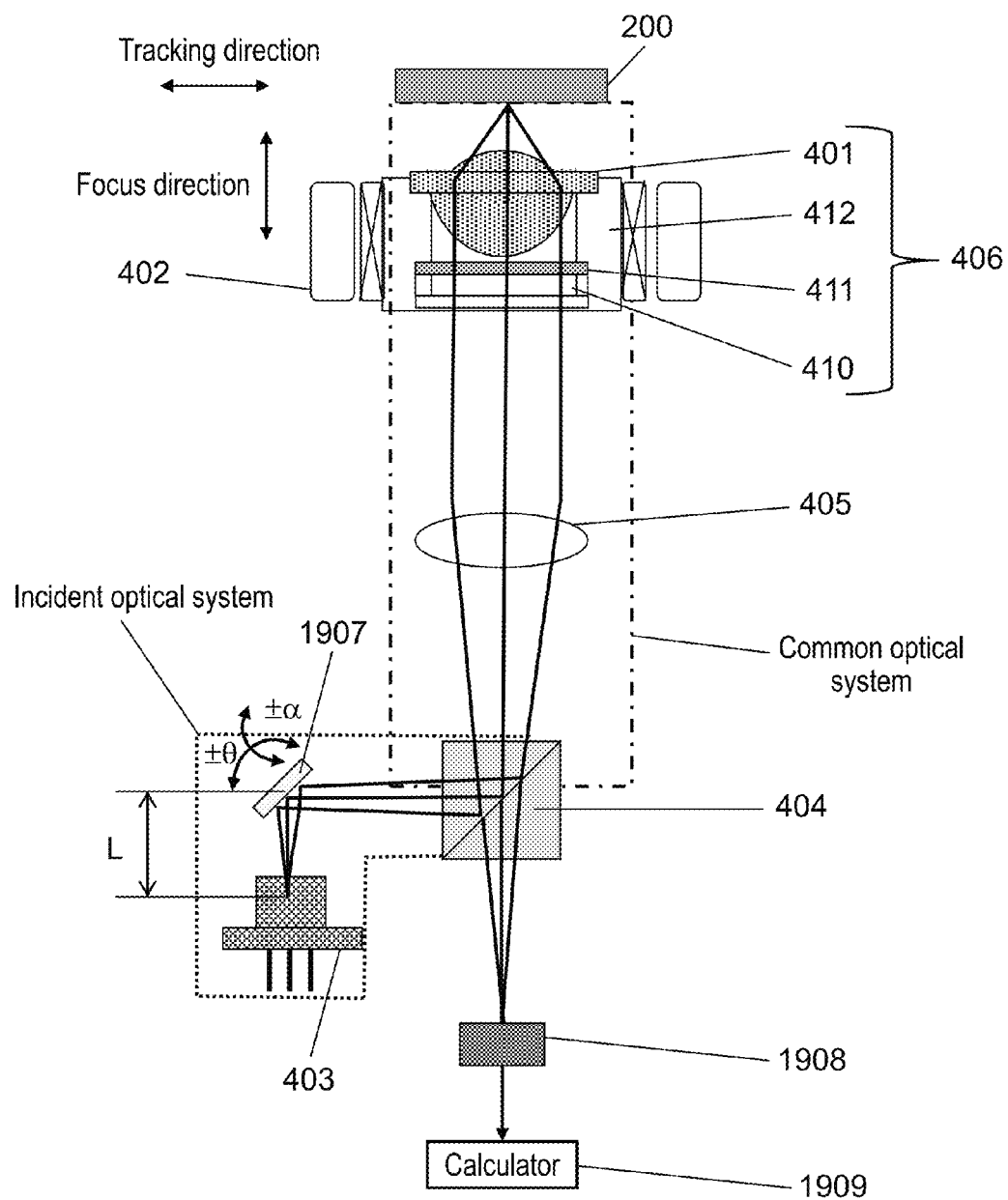
FIG. 19 is a view illustrating a configuration of a pickup unit according to a second exemplary embodiment.

FIG. 19 is a view illustrating a configuration of pickup unit PU30 of the present exemplary embodiment. Pickup unit PU1 of the first exemplary embodiment differs from pickup unit PU30 of the present exemplary embodiment in tracking mirror 1907, photodetector 1908, and calculator 1909. Because other configurations of pickup unit PU30 are identical to those of pickup unit PU1, the description is omitted.

In a case where tracking mirror 1907 is operated in the tracking direction, pickup unit PU30 of the present exemplary embodiment is identical to pickup unit PU1 of the first exemplary embodiment.

Figure 20:
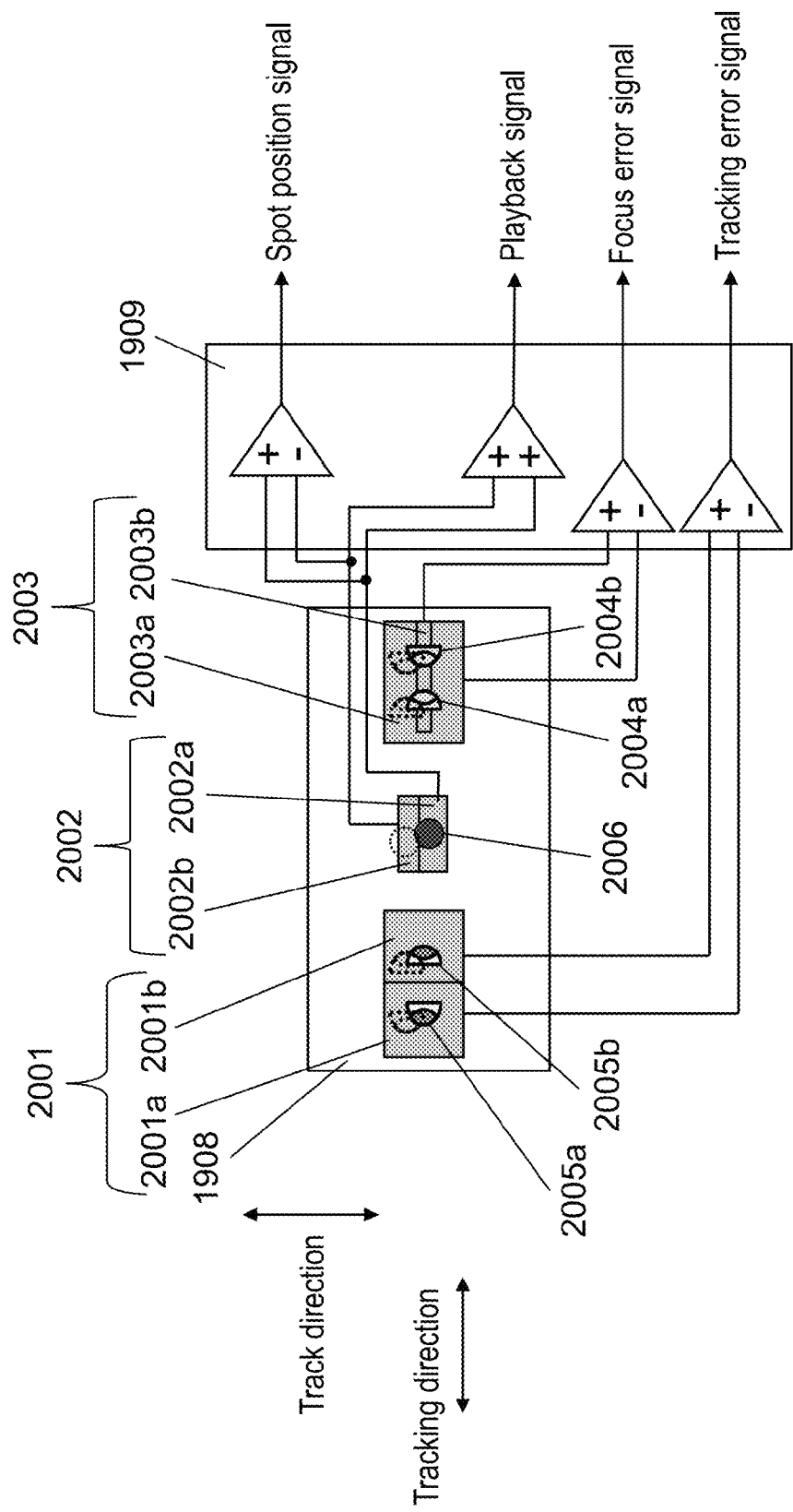
FIG. 20 is a block diagram illustrating a photodetector and a calculator of the second exemplary embodiment.

FIG. 20 is a block diagram illustrating photodetector 1908 and calculator 1909 of the present exemplary embodiment. Photodetector 1908 includes light receiving elements 2001, 2002, and 2003. Using light receiving elements 2001, 2002, and 2003, calculator 1909 generates a spot position signal, the tracking error signal, the focus error signal, and the playback signal.

The +1st-order light beam diffracted by polarization hologram plate 410 is incident on light receiving element 2003. Light receiving element 2003 includes light receiving element 2003a and light receiving element 2003b into which light receiving element 2003 is divided. When the light beam reflected from optical tape 200 is incident on light receiving element 2003a and light receiving element 2003b, spots 2004a and 2004b are formed in light receiving elements 2003a and 2003b by the reflected light beam. Calculator 1909 generates the focus error signal by the spot size method in which a size of the spot formed in the light receiving element is detected through the differential calculation between the outputs of light receiving element 2003a and light receiving element 2003b.

The −1st-order light beam diffracted by polarization hologram plate 410 is incident on light receiving element 2001. Light receiving element 2001 includes light receiving element 2001a and light receiving element 2001b into which light receiving element 2001 is divided. When the light beam reflected from optical tape 200 is incident on light receiving element 2001a and light receiving element 2001b, spot 2005a is formed in light receiving element 2001a by the reflected light beam, and spot 2005b is formed in light receiving element 2001b by the reflected light beam. Through the differential calculation between the outputs of light receiving element 2001a and light receiving element 2001b, calculator 1909 generates the tracking error signal by the ECFF method.

The 0-order light beam that is transmitted through polarization hologram plate 410 without the diffraction is incident on light receiving element 2002. Light receiving element 2002 includes light receiving element 2002a and light receiving element 2002b into which light receiving element 2002 is divided. Spot 2006 is formed in light receiving element 2002 by the reflected light beam. The playback signal is generated by a sum signal of the outputs of light receiving element 2002a and light receiving element 2002b. The spot position signal is further generated by a difference signal of the outputs of light receiving element 2002a and light receiving element 2002b. The present exemplary embodiment differs from the first exemplary embodiment in that the spot position signal can be detected without increasing the number of light receiving elements of photodetector 1908.

In FIG. 20, in a case where spot 2006 moves and spreads out of light receiving element 2002, the level degradation or a waveform deformation of the playback signal is generated.

The offset is generated in the differential output of the focus error signal by the movements of spots 2004a and 2004b.

Figure 21A:
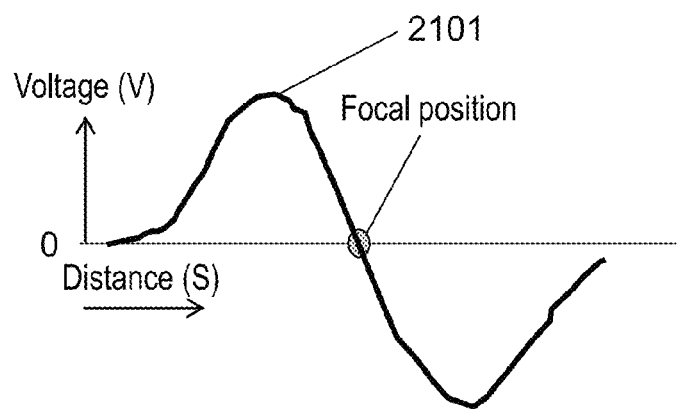
FIG. 21A is a view illustrating a focus S-curve of a focus error signal in the second exemplary embodiment.
Figure 21B:
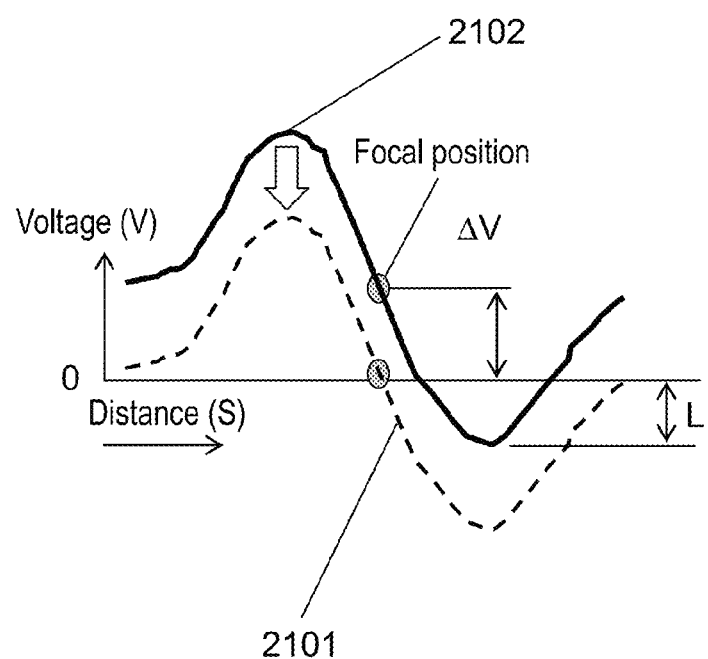
FIG. 21B is a view illustrating the focus S-curve when an offset of a focus error signal is generated in the second exemplary embodiment.

FIG. 21A is a view illustrating focus S-curve 2101 of the focus error signal, and FIG. 21B is a view illustrating focus S-curve 2102 when the offset is generated in the focus error signal.

In FIG. 21A, focus S-curve 2101 is a focus S-curve at the time of the production. Focus S-curve 2101 is adjusted such that focal position coincides with a differential output voltage of substantial zero. In focus S-curve 2102 of FIG. 21B, the spot moves due to the aging or the like. In focus S-curve 2101, an offset voltage ΔV is generated, and a focal deviation is generated.

When the focal deviation is generated, the spot in which the image is formed on optical tape 200 is enlarged to degrade a recording or playback capability. In general, frequently the offset voltage ΔV is obtained by learning and the focal position is deviated in a pseudo manner to perform the recording and playback. At this point, it is necessary to put the focus control into an on state for the purpose of learning. However, before the focus control is put into the on state, focus S-curve 2102 deviates when objective lens 401 is brought close to optical tape 200 to start a drawing operation at the position of voltage V of 0. Accordingly, a gain proportional to a differential coefficient dV/dS of the focus S-curve is low, drawing thrust is decreased, and the focus is located at an end of the focus S-curve. Therefore, the focus immediately strays when the drawing deviates slightly.

Accordingly, the focus control is hardly put into the on state, and the optical recording and playback apparatus is hardly operated.

The operation of tracking mirror 1907 will be described below. When tracking mirror 1907 is driven in the track direction by ±α radian, the light beam is polarized by ±2α radian. Assuming that L is a distance between light source 403 and tracking mirror 1907, the spot varies by 2αL on photodetector 1908. Accordingly, using the spot position signal of spot 2006, the spot on photodetector 1908 is moved by the operation of tracking mirror 1907, and the positioning is performed such that the voltage at the time of the production is obtained. When the driving voltage in the track direction of tracking mirror 1907 is maintained in the positioning state, spots 2004a, 2004b, 2005a, 2005b, and 2006 on photodetector 1908 can be returned to the positions at the time of the production. Accordingly, the level degradation and waveform deformation of the playback signal or the offset of the focus signal can be resolved.

There is no particular limitation to timing in the running of tracking mirror 1907 in the track direction. For example, tracking mirror 1907 is operated in the track direction during the recording or playback, in initial learning at start-up of the optical tape apparatus, during a waiting state for the next operation, or in a rapid change in device temperature.

The operation of tracking mirror 1907 in the track direction can correct the spot position error generated by the aging to resolve the signal degradation or focus error signal offset, which is caused by the spread-out of the spot from the light receiving element. In the present exemplary embodiment, the signal quality degradation caused by the aging or temperature change of the optical recording and playback apparatus can be prevented. Additionally, only the spot and photodetector 1908 are coarsely adjusted during the production of the optical recording and playback apparatus, and the final adjustment is finely performed using tracking mirror 1907, so that the adjustment can be rationalized at the time of the production. Particularly, because adjustment accuracy is required in the track direction, a large effect can be expected in the adjustment man-hour and a production yield.

What is claimed is:

1. An optical recording and playback apparatus comprising:
   a light source configured to emit a light beam for forming a recording mark in an optical tape or a light beam for reading a state of the recording mark;
   a tracking mirror configured to change a direction of the light beam emitted from the light source;
   a collimator configured to form the light beam going through the tracking mirror into a parallel light beam;
   an objective lens configured to collect the parallel light beam from the collimator to the optical tape;
   a lens actuator configured to adjust a position of the objective lens in a focus direction of the optical tape and a position of the objective lens in a tracking direction of the optical tape;
   a polarization hologram plate configured to separate a reflected light beam of the light beam with which the optical tape is irradiated through the objective lens into a plurality of light fluxes;
   a photodetector having a plurality of light receiving elements configured to receive the plurality of light fluxes; and
   a control circuit configured to control the lens actuator and the tracking mirror,
   wherein
   the tracking mirror is disposed near the light source, and movable in the tracking direction,
   a numerical aperture of the objective lens ranges from 0.8 to 0.9 inclusive, and
   the tracking mirror is movable within ±0.3 degrees in the tracking direction.

2. An optical recording and playback apparatus comprising:
   a light source configured to emit a light beam for forming a recording mark in an optical tape or a light beam for reading a state of the recording mark;
   a tracking mirror configured to change a direction of the light beam emitted from the light source;
   a collimator configured to form the light beam going through the tracking mirror into a parallel light beam;
   an objective lens configured to collect the parallel light beam from the collimator to the optical tape;
   a lens actuator configured to adjust a position of the objective lens in a focus direction of the optical tape and a position of the objective lens in a tracking direction of the optical tape;
   a polarization hologram plate configured to separate a reflected light beam of the light beam with which the optical tape is irradiated through the objective lens into a plurality of light fluxes;
   a photodetector having a plurality of light receiving elements configured to receive the plurality of light fluxes; and
   a control circuit configured to control the lens actuator and the tracking mirror,
   wherein
   the tracking mirror is disposed near the light source, and movable in the tracking direction, and
   the tracking mirror is located within 6.5 mm from the light source.

3. The optical recording and playback apparatus according to claim 1, wherein the tracking mirror is a micro electro mechanical systems (MEMS) mirror made of a silicon crystal, and has a size ranging from 1.3 mm to 2.4 mm inclusive and a thickness ranging from 10 um to 50 um inclusive.

4. The optical recording and playback apparatus according to claim 1, further comprising a quarter-wave plate configured to circularly polarize a transmitted light beam,
   wherein the objective lens, the polarization hologram plate, and the quarter-wave plate are integrally driven by the lens actuator, and positions of the objective lens, the polarization hologram plate, and the quarter-wave plate are adjusted in the tracking direction by an ECFF (Exchanged Correct Far Field) method.

5. The optical recording and playback apparatus according to claim 1, wherein the tracking mirror is also movable in a track direction of the optical tape.

6. The optical recording and playback apparatus according to claim 5, further comprising a calculator,
   wherein the calculator is configured to generate a spot position signal indicating a position of a spot formed in the light receiving element of the photodetector, and
   the control circuit is configured to control the tracking mirror using the spot position signal so as to correct the position of the spot.

\* \* \* \* \*